United States Patent
Yamamoto et al.

(10) Patent No.: US 8,761,982 B2
(45) Date of Patent: Jun. 24, 2014

(54) VEHICLE

(75) Inventors: Akihiro Yamamoto, Wako (JP); Junji Kato, Wako (JP); Yuichi Nakamura, Wako (JP); Hiroshi Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 13/439,848

(22) Filed: Apr. 5, 2012

(65) Prior Publication Data

US 2012/0259492 A1     Oct. 11, 2012

(30) Foreign Application Priority Data

Apr. 7, 2011   (JP) .................................. 2011-085653

(51) Int. Cl.
| | |
|---|---|
| *B60L 9/00* | (2006.01) |
| *B60K 6/52* | (2007.10) |
| *B60K 7/00* | (2006.01) |
| *B60K 17/356* | (2006.01) |

(52) U.S. Cl.
CPC ............... *B60K 6/52* (2013.01); *B60K 7/0007* (2013.01); *B60K 2007/0061* (2013.01); *B60K 17/356* (2013.01); *Y10S 903/903* (2013.01)
USPC .................... 701/22; 180/65.285; 903/903

(58) Field of Classification Search
CPC ........ B60K 6/52; B60K 7/0007; B60K 17/02; B60K 17/046; B60K 2007/0046; B60K 2007/0061; B60K 2007/0092; B60K 17/356
USPC ............. 701/22, 51, 69, 70, 74, 81; 180/239, 180/240, 251, 252, 65.285; 903/903
See application file for complete search history.

(56) References Cited

U.S. PATENT DOCUMENTS

| | | | | |
|---|---|---|---|---|
| 4,866,625 | A | * | 9/1989 | Kawamoto et al. ............. 701/89 |
| 4,938,306 | A | * | 7/1990 | Sumiyoshi et al. ........... 180/233 |
| 5,301,768 | A | * | 4/1994 | Ishikawa et al. .............. 180/249 |

(Continued)

FOREIGN PATENT DOCUMENTS

| | | |
|---|---|---|
| JP | 2003-312279 | 11/2003 |
| JP | 2005-349917 | 12/2005 |

(Continued)

OTHER PUBLICATIONS

Japanese Office Action for corresponding JP Application No. 2011-085653, Apr. 18, 2013.
JP Decision of patent grant issued in corresponding JP Application No. 2011-085653, Jul. 10, 2013.

*Primary Examiner* — Gertrude Arthur Jeanglaud
(74) *Attorney, Agent, or Firm* — Ditthavong Mori & Steiner, P.C.

(57) ABSTRACT

A vehicle includes a first drive device and a second drive device. The first drive device includes a motor, a motor control device, a connection-disconnection device, and a connection-disconnection device controller. When the vehicle is driven in a state where a driving force of the first drive device is substantially zero, or the vehicle is driven only by a driving force of the second drive device, the connection-disconnection device controller couples the connection-disconnection device to establish a connected state of the connection-disconnection device. The motor control device is configured to perform loss reduction control on the motor to reduce at least one of a loss of the motor and a loss in a power transmission path in power transmitted to the first driving wheel, by establishing the connected state of the connection-disconnection device.

20 Claims, 19 Drawing Sheets

(56) References Cited

U.S. PATENT DOCUMENTS 5,415,598 A * 5/1995 Sawase et al. .................. 475/86
5,799,748 A * 9/1998 Origuchi ....................... 180/233
6,005,358 A * 12/1999 Radev .......................... 318/139

FOREIGN PATENT DOCUMENTS

| JP | 2007-223454 | 9/2007 |
| JP | 2010-233373 | 10/2010 |
| WO | WO 2011/013829 | 2/2011 |

* cited by examiner

FIG. 13

| VEHICLE STATE | FRONT UNIT | REAR UNIT | REAR MOTOR | EOP | SOL | OWC | BRK |
|---|---|---|---|---|---|---|---|
| STOPPED | X | X | SHUTDOWN | OFF | OFF | OFF | OFF |
| FORWARD TRAVEL (LOW SPEED) | X | O | POWER DRIVE | Lo | OFF | ON | ON (WEAK COUPLING) |
| FORWARD TRAVEL (MIDDLE SPEED) | O | X | SHUTDOWN | Lo | OFF | OFF | ON (WEAK COUPLING) |
| REGENERATIVE DECELERATION | O | O | REGENERATIVE DRIVE | Hi | OFF | OFF | ON |
| ACCELERATION | O | O | POWER DRIVE | Lo | OFF | ON | ON (WEAK COUPLING) |
| FORWARD TRAVEL (HIGH SPEED) | O | X | SHUTDOWN | Lo | ON | OFF | OFF |
| REVERSE TRAVEL | X | O | REVERSE POWER DRIVE | Hi | OFF | OFF | ON |

VEHICLE

CROSS-REFERENCE TO RELATED APPLICATIONS

The present application claims priority under 35 U.S.C. §119 to Japanese Patent Application No. 2011-085653, filed Apr. 7, 2011, entitled "Vehicle." The contents of this application are incorporated herein by reference in their entirety.

BACKGROUND OF THE INVENTION

1. Field of the Invention

The present invention relates to a vehicle.

2. Discussion of the Background

Japanese Unexamined Patent Application Publication No. 2005-349917 discloses a four-wheel drive vehicle provided with a front-wheel drive device and a rear-wheel drive device, the rear-wheel drive device being provided with a clutch which allows an electric motor as a drive source to be disconnected, and in the case where clutch dragging torque occurs in the clutch, motor drag control is performed to control the rotational number of the electric motor so that the rotational number of rear wheels is matched with the rotational number of front wheels.

SUMMARY OF THE INVENTION

According to one aspect of the present invention, a vehicle includes a first drive device and a second drive device. The first drive device is to drive a first driving wheel which is one of a front wheel and a rear wheel. The second drive device is to drive a second driving wheel which is another of the front wheel and the rear wheel. The first drive device includes a motor, a motor control device, a connection-disconnection device, and a connection-disconnection device controller. The motor is configured to generate a driving force of the vehicle. The motor control device is configured to control the motor. The connection-disconnection device is provided on a power transmission path between the motor and the first driving wheel. The connection-disconnection device is configured to establish a connected state or a disconnected state between the motor and the first driving wheel by releasing or coupling the connection-disconnection device. The connection-disconnection device controller is configured to control the connection-disconnection device. When the vehicle is driven in a state where a driving force of the first drive device is substantially zero, or the vehicle is driven only by a driving force of the second drive device, the connection-disconnection device controller couples the connection-disconnection device to establish the connected state of the connection-disconnection device. The motor control device is configured to perform loss reduction control on the motor to reduce at least one of a loss of the motor and a loss in the power transmission path in power transmitted to the first driving wheel, by establishing the connected state of the connection-disconnection device.

According to another aspect of the present invention, a vehicle includes a first drive device and a second drive device. The first drive device is to drive a first driving wheel which is one of a front wheel and a rear wheel. The second drive device is to drive a second driving wheel which is another of the front wheel and the rear wheel. The first drive device includes a motor and a motor control device. The motor is constantly connected to the first driving wheel. The motor is configured to generate a driving force of the vehicle. The motor control device is configured to control the motor. When the vehicle is driven in a state where a driving force of the first drive device is substantially zero, or the vehicle is driven only by a driving force of the second drive device, the motor control device performs loss reduction control on the motor so as to reduce a loss of the motor in power transmitted to the first driving wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 a table listing a relationship between a front-wheel drive device and a rear-wheel drive device in a vehicle state, in combination with an operating state of a motor and a state of a hydraulic circuit.

DESCRIPTION OF THE EMBODIMENTS

Figure 1:
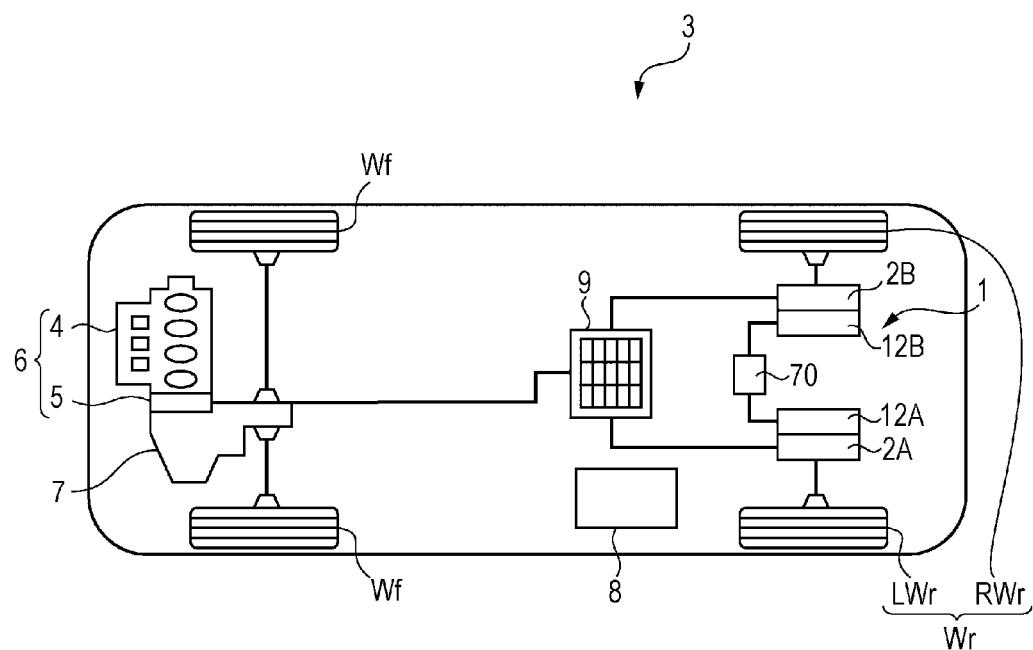
FIG. 1 is a block diagram showing the schematic configuration of a hybrid vehicle according to an embodiment of the present disclosure.

A vehicle (for example, a vehicle 3 in the embodiment described below) according to a first aspect of the embodiment includes: a first drive device (for example, a rear-wheel drive device 1 in the embodiment described below) configured to drive a first driving wheel (for example, a rear wheel Wr in the embodiment described below) which is either a front wheel or a rear wheel; and a second drive device (for example, a front-wheel drive device 6 in the embodiment described below) configured to drive a second driving wheel (for example, a front wheel Wf in the embodiment described below) which is an other wheel of the front wheel or the rear wheel, wherein the first drive device includes a motor (for example, motors 2A, 2B in the embodiment described below) configured to generate a driving force of the vehicle, a motor control device (for example, a control unit 8 in the embodiment described below) configured to control the motor, a connection-disconnection unit (for example, hydraulic brakes 60A, 60B in the embodiment described below) which is provided on a power transmission path between the motor and the first driving wheel, and is configured to establish a connected state or a disconnected state between the motor and the first driving wheel by releasing or coupling the connection-disconnection unit, and a connection-disconnection unit control device (for example, the control unit 8 in the embodiment described below) configured to control the connection-disconnection unit, wherein when the vehicle is driven in a state where a driving force of the first drive device is substantially zero, or the vehicle is driven only by a driving force of the second drive device, the connection-disconnection unit control device couples the connection-disconnection unit to establish a connected state, and the motor control device performs loss reduction control (for example, motor end zero torque control, and wheel end zero torque control in the embodiment described below) on the motor so as to reduce a loss of at least one of the motor and the power transmission path in power transmitted to the first driving wheel, by establishing the connected state of the connection-disconnection unit. According to the first aspect of the embodiment, when the vehicle is driven in a state where a driving force of the first drive device is substantially zero, or the vehicle is driven only by a driving force of the second drive device, matching of rotational number normally required when the motor of the first drive device is driven again may be omitted by establishing a connected state of the connection-disconnection unit. In this case, the motor and its transmission path causes a loss and gives a load (a negative torque) to the wheels at the time of coupling the connection-disconnection unit, the running performance of the vehicle may be improved by controlling the motor to reduce the loss.

According to a second aspect of the embodiment, the loss reduction control acquires a loss of the motor and a loss in the power transmission path, and controls the motor so as to reduce both of the loss in addition to the configuration of the first aspect of the embodiment. According to the second aspect of the embodiment, by performing the loss reduction control which acquires (hereinafter, includes estimate and detection of a loss) a loss of the motor and a loss in the power transmission path, almost all losses are taken into consideration, and thus the negative torque accompanying the loss in the first driving wheel may be reduced to substantially zero.

According to a third aspect of the embodiment, the loss reduction control acquires a loss of the motor, and controls the motor so as to reduce the loss in addition to the configuration of the first aspect of the embodiment. According to the third aspect of the embodiment, only the loss of the motor is acquired, and thus the acquisition of the loss is easy.

According to a fourth aspect of the embodiment, the loss reduction control acquires a loss in the power transmission path, and controls the motor so as to reduce the loss in addition to the configuration of the first aspect of the embodiment. According to the fourth aspect of the embodiment, the influence of the loss in the power transmission path may be reduced.

According to a fifth aspect of the embodiment, the loss is determined based on at least one of rotational number of the motor, rotational number of a rotating member which constitutes the power transmission path, and a temperature of the motor in addition to the configuration of the second aspect of the embodiment. According to the fifth aspect of the embodiment, the loss may be easily estimated.

According to a sixth aspect of the embodiment, the loss is determined based on a current of the motor in addition to the configuration of the second aspect of the embodiment. According to the sixth aspect of the embodiment, the loss of the motor is determined based on a current of the motor, and thus the precision in estimating the loss may be improved.

According to a seventh aspect of the embodiment, the loss is measured experimentally or is calculated and stored in advance in addition to the configuration of the fifth aspect of the embodiment. According to the seventh aspect of the embodiment, successive calculation (estimation) of the loss is made unnecessary by determining the loss in advance.

According to an eighth aspect of the embodiment, the embodiment further includes an one-way power transmission unit (for example, an one-way clutch 50 in the embodiment described below) which is provided on the power transmission path between the motor and the first driving wheel, in parallel with the connection-disconnection unit, and when a rotational power of the motor in a forward direction is inputted to the first driving wheel, the connection-disconnection unit is set in an engaged state, when a rotational power of the motor in a rearward direction is inputted to the first driving wheel, the connection-disconnection unit is set in a disengaged state, when a rotational power of the first driving wheel in a forward direction is inputted to the motor, the connection-disconnection unit is set in a disengaged state, and when a rotational power of the first driving wheel in a rearward direction is inputted to the motor, the connection-disconnection unit is set in an engaged state, in addition to the configuration of the first aspect of the embodiment. According to the eighth aspect of the embodiment, when the rotational power of the motor in the forward direction is inputted to the first driving wheel, one-way power transmission unit is set in an engaged state to allow the transmission of power by the one-way power transmission unit. Consequently, the connection-disconnection unit may be released, or the coupling force in a connected state of the connection-disconnection unit may be decreased, and thus the energy accompanying the coupling of the connection-disconnection unit may be reduced.

In order to provide such a vehicle, a vehicle according to a ninth aspect of the embodiment includes: a first drive device (for example, the rear-wheel drive device 1 in the embodiment described below) configured to drive a first driving wheel (for example, the rear wheel Wr in the embodiment described below) which is either a front wheel or a rear wheel; and a second drive device (for example, the front-wheel drive device 6 in the embodiment described below) configured to drive a second driving wheel (for example, the front wheel Wf in the embodiment described below) which is an other wheel of the front wheel or the rear wheel, wherein the first drive device includes a motor (for example, the motors 2A, 2B in the embodiment described below) which is constantly connected to the first driving wheel, and is configured to generate a driving force of the vehicle, and a motor control device (for example, the control unit 8 in the embodiment described below) configured to control the motor, wherein when the vehicle is driven in a state where a driving force of the first drive device is substantially zero, or the vehicle is driven only by a driving force of the second drive device, the motor control device performs loss reduction control (for example, the motor end zero torque control, and the wheel end zero torque control in the embodiment described below) on the motor so as to reduce a loss of the motor in power transmitted to the first driving wheel. According to the ninth aspect of the embodiment, when the vehicle is driven in a state where the driving force of the first drive device is substantially zero, or the vehicle is driven only by the driving force of the second drive device, a loss of the motor gives a load (a negative torque) to the wheels, and thus the running performance of the vehicle may be improved by controlling the motor to reduce the loss.

According to a tenth aspect of the embodiment, the loss is determined based on at least one of rotational number of the motor and a temperature of the motor, in addition to the configuration of the ninth aspect of the embodiment. According to the tenth aspect of the embodiment, the loss may be easily estimated.

According to an eleventh aspect of the embodiment, the loss is determined based on a current of the motor in addition to the configuration of the ninth aspect of the embodiment. According to the eleventh aspect of the embodiment, the precision in estimating the loss may be improved by determining the loss of the motor based on the current of the motor.

According to a twelfth aspect of the embodiment, the loss is measured experimentally or is calculated and stored in advance in addition to the configuration of the tenth aspect of the embodiment. According to the twelfth aspect of the embodiment, successive calculation (estimation) of the loss is made unnecessary by determining the loss in advance.

The embodiments will now be described with reference to the accompanying drawings, wherein like reference numerals designate corresponding or identical elements throughout the various drawings.

First, a vehicle according to an embodiment of the present disclosure is described with reference to FIGS. 1 to 4. The vehicle according to an embodiment is used, for example, as a vehicle with a drive system as illustrated in FIG. 1. A vehicles 3 illustrated in FIG. 1 is a hybrid vehicle which has, at a front portion of the vehicle, a drive device 6 (hereinafter referred to as a front-wheel drive device) in which an internal combustion engine 4 and a motor 5 are connected to each other in series. The power of the front-wheel drive device 6 is transmitted to front wheels Wf via a transmission 7, while the power of a drive device 1 (hereinafter referred to as a rear-wheel drive device) disposed at a rear portion of the vehicle separately from the front-wheel drive device 6 is transmitted to rear wheels Wr (RWr, LWr). The motor 5 of the front-wheel drive device 6, and motors 2A, 2B of the rear-wheel drive device 1 that face the rear wheels Wr are connected to a battery 9 so that power supply from the battery 9 and energy regeneration to the battery 9 may be made. Numeral 8 indicates a control unit to perform various types of control for the entire vehicle. The drive device 6 may be used as the rear-wheel drive device, and the drive device 1 may be used as the front-wheel drive device, however, in the present embodiment, description is given by assuming that the drive device 6 is the front-wheel drive device, and the drive device 1 is the rear-wheel drive device.

Figure 2:
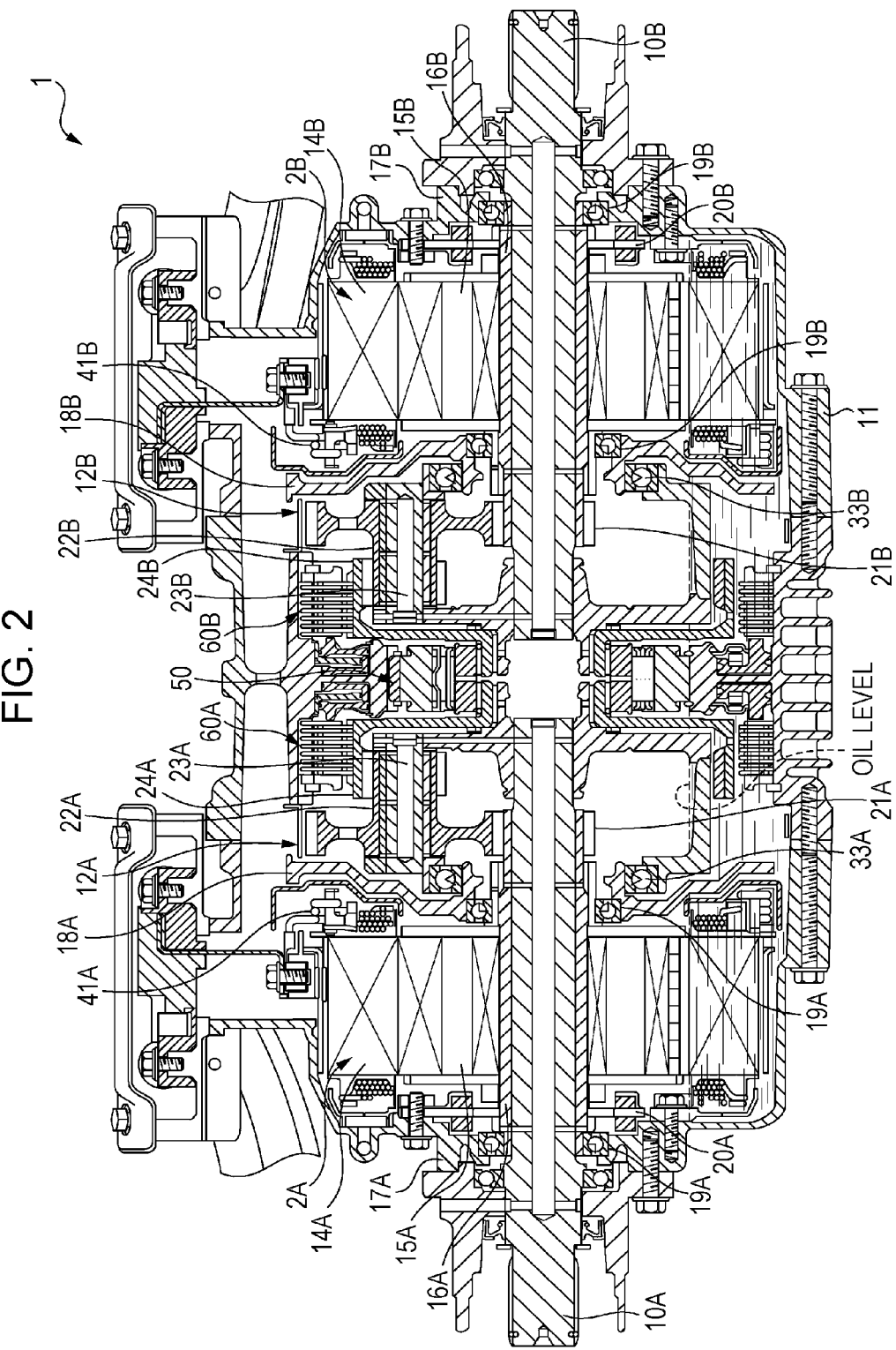
FIG. 2 is a vertical sectional view of a rear-wheel drive device according to an embodiment.
Figure 4:
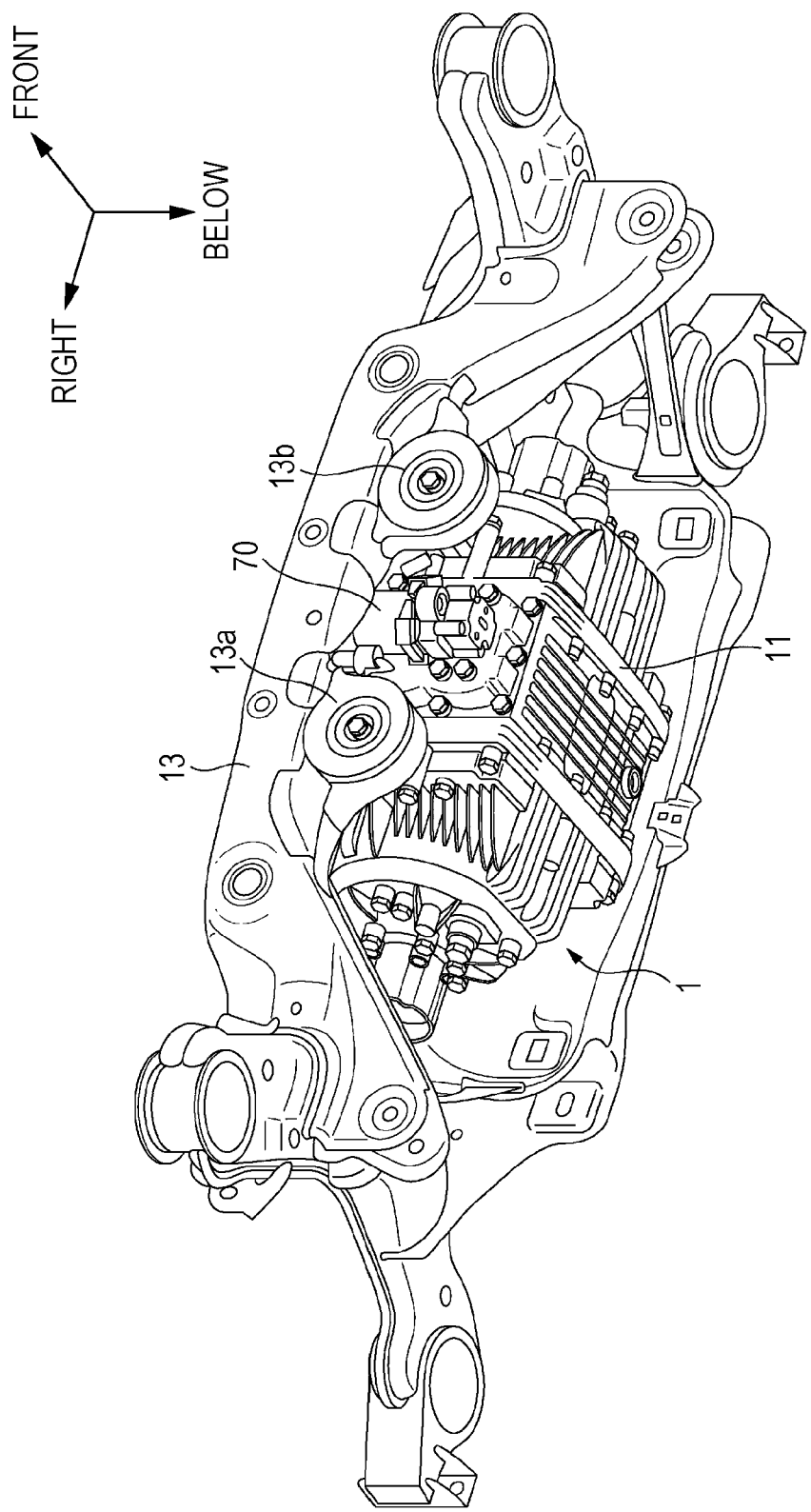
FIG. 4 is a perspective view illustrating a state in which the rear-wheel drive device is mounted on a frame.

FIG. 2 illustrates a vertical sectional view of the overall rear-wheel drive device 1. In FIGS. 2, 10A and 10B respectively indicate the axles on the left and right on the rear wheels Wr side of the vehicle 3, and are disposed on the same axis in the vehicle width direction. A speed reducer case 11 for the rear-wheel drive device 1 is generally formed in a substantially cylindrical shape, and in the speed reducer case 11, motors 2A, 2B for shaft drive, and planetary gear speed reducers 12A, 12B which reduce drive rotation of the motors 2A, 2B are disposed on the same axis as the axles 10A, 10B. The motor 2A and the planetary gear speed reducer 12A controls the left rear wheel LWr; and the motor 2B and the planetary gear speed reducer 12B controls the right rear wheel RWr where the motor 2A and the planetary gear speed reducer 12A, and the motor 2B and the planetary gear speed reducer 12B are symmetrically disposed in the vehicle width direction in the speed reducer case 11. As illustrated in FIG. 4, the speed reducer case 11 is supported by supporting portions 13a, 13b of a frame member 13 which is a portion of a frame serving as the framework of the vehicle 3, and the frame (not shown) of the rear-wheel drive device 1. The supporting portions 13a, 13b are respectively provided on the right and left sides with respect to the center of the frame member 13 in the vehicle width direction. The arrows in FIG. 4 indicate the positional relationship with the vehicle 3 in a state where the rear-wheel drive device 1 is mounted on the vehicle 3.

Stators 14A, 14B of the motors 2A, 2B are fixed inside the right and left end portions of the speed reducer case 11, respectively, and cylindrical rotors 15A, 15B are rotatably disposed on the inner circumferential side of the stators 14A, 14B. Cylinder shafts 16A, 16B that surround the outer circumference of the axles 10A, 10B are connected to the inner circumferential side of the rotors 15A, 15B. The cylinder shafts 16A, 16B are supported at end walls 17A, 17B and intermediate walls 18A, 18B of the speed reducer case 11 via bearings 19A, 19B so as to be relatively rotatable coaxially with the axles 10A, 10B. The end walls 17A, 17B of the speed reducer case 11 on the outer circumference of respective one ends of the cylinder shafts 16A, 16B are provided with resolvers 20A, 20B for feeding back rotational position information of the rotors 15A, 15B to the controller (not shown) of the motors 2A, 2B, respectively.

Planetary gear speed reducers 12A 12B respectively include sun gears 21A, 21B, a plurality of planetary gears 22A, 22B that engage with the sun gears 21, planetary carriers 23A, 23B to support the planetary gears 22A, 22B, and ring gears 24A, 24B that engage with the outer circumferential sides of the planetary gears 22A, 22B. Driving forces of the motors 2A, 2B are respectively inputted from the sun gears 21A, 21B so that reduced driving forces are outputted through the planetary carriers 23A, 23B.

Figure 3:
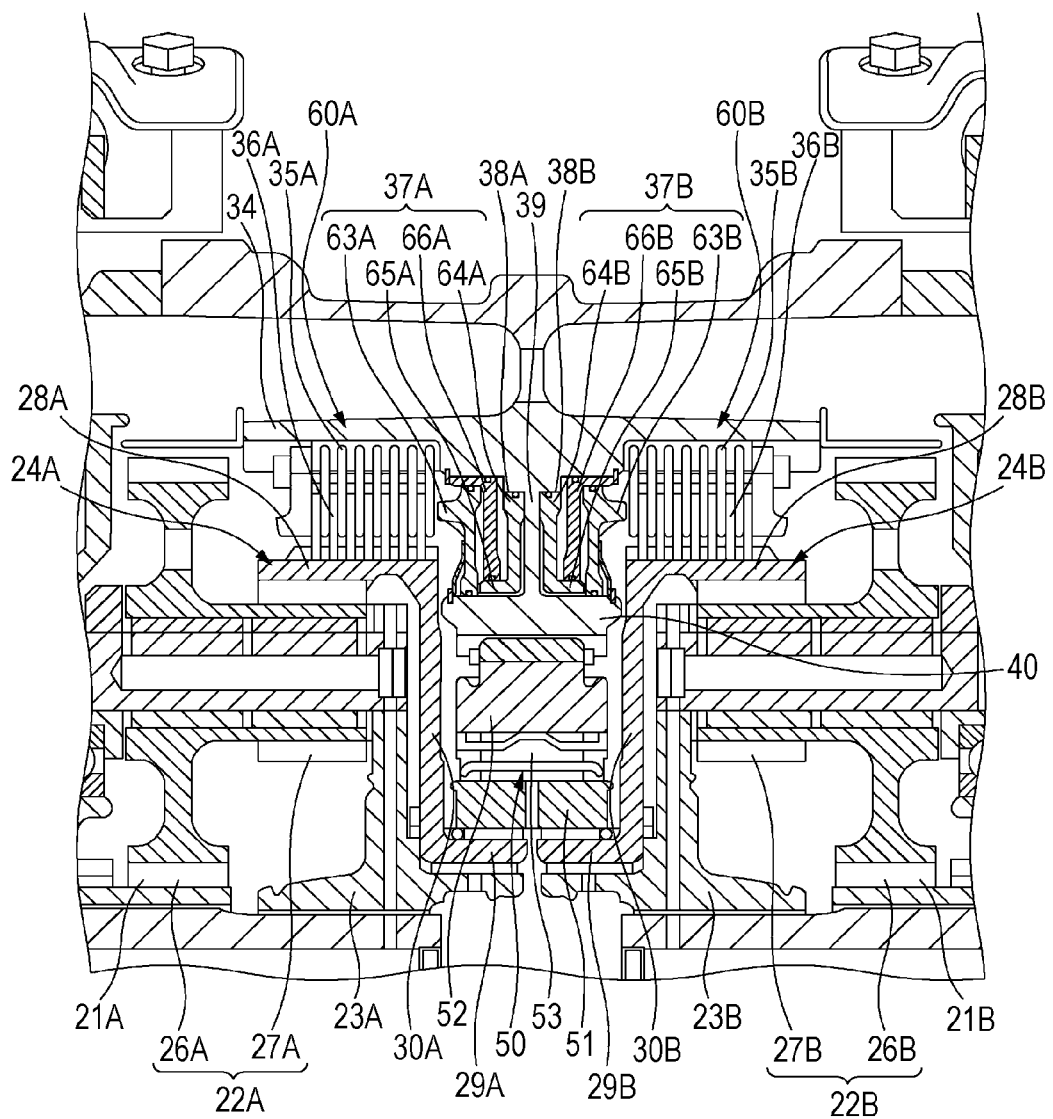
FIG. 3 is a partially enlarged view of the rear-wheel drive device illustrated in FIG. 2.

The sun gears 21A, 21B are integrally formed with the cylinder shafts 16A, 16B. The planetary gears 22A, 22B are two-part gears that include, for example, as shown in FIG. 3, first pinions 26A, 26B with a major diameter, which are directly engaged with the sun gears 21A, 21B, and second pinions 27A, 27B with a minor diameter smaller than the major diameter of the first pinions 26A, 26B. The first pinions 26A, 26B and the second pinions 27A, 27B are coaxially, integrally formed with an offset in the axial direction, respectively. The planetary gears 22A, 22B are supported by the planetary carriers 23A, 23B, and the axially inner ends of thereof radially extend inwardly, and are spline-fitted to and integrally rotatably supported by the axles 10A, 10B, while being supported by the intermediate walls 18A, 18B via bearings 33A, 33B.

The intermediate walls 18A, 18B separate motor housing space for housing the motors 2A, 2B from speed reducer space for housing the planetary gear speed reducers 12A, 12B, and are bent stepwise so that the distance between the intermediate walls 18A, 18B in the axle direction is increased from the outer radial side to the inner radial side. Bearings 33A, 33B to support the planetary carriers 23A, 23B are disposed on the inner radial side and the planetary gear speed reducers 12A, 12B side, between the intermediate walls 18A, 18B, while bus rings 41A, 41B for stators 14A, 14B are disposed on the outer radial side and on the motors 2A, 2B side, between the intermediate walls 18A, 18B (see FIG. 2).

The ring gears 24A, 24B includes gear portions 28A, 28B, the inner circumferential sides thereof being engaged with the second pinions 27A, 27B with a minor diameter; narrow diameter portions 29A, 29B that are narrower than the gear portions 28A, 28B in diameter, and face each other in the middle position of the speed reducer case 11; and connecting portion 30A, 30B that radially connect the axially inner ends of the gear portions 28A, 28B to the axially outer ends of the narrow diameter portions 29A, 29B. In the case of the embodiment, the maximum radius of the ring gears 24A, 24B are set to be smaller than the maximum distance between the first pinions 26A, 26B and the center of the axles 10A, 10B. The narrow diameter portions 29A, 29B are both spline-fitted to a below-described inner lace 51 of one-way clutch 50 so that the ring gears 24A, 24B are rotated integrally with the inner lace 51 of the one-way clutch 50.

A cylindrical space portion is secured between the speed reducer case 11 and the ring gears 24A, 24B, and in the cylindrical space portion, hydraulic brakes 60A, 60B serving as a braking device for the ring gears 24A, 24B lap the first pinions 26A, 26B in the radial direction, and lap the second pinions 27A, 27B in the axial direction. The hydraulic brakes 60A, 60B are configured such that a plurality of fixed plates 35A, 35B and a plurality of rotary plates 36A, 36B are disposed alternately in the axial direction on the inner radial side of the speed reducer case 11, and the plates 35A, 35B, 36A, 36B are operated for coupling and release by ring-shaped pistons 37A, 37B, the fixed plates 35A, 35B being spline-fitted to the inner circumferential surface of an outer radial side cylindrical supporting portion 34 which extends in the axial direction, and the rotary plates 36A, 36B being spline-fitted to the outer circumferential surfaces of the ring gears 24A, 24B. The pistons 37A, 37B are extendably and retractably housed in a right-and-left partition wall 39 which extends from the middle position of the speed reducer case 11 to the inner radial side, and circular cylinder chambers 38A, 38B which is connected by the right-and-left partition wall 39, and is formed between the outer radial side supporting portion 34 and an inner radial side supporting portion 40. The pistons 37A, 37B are extended by introducing a high pressure oil into the cylinder chambers 38A, 38B, and are retracted by discharging the oil from the cylinder chambers 38A, 38B. As illustrated in FIG. 4, the hydraulic brakes 60A, 60B are connected to an electric oil pump 70 which is disposed between the supporting portions 13a and 13b of the frame member 13 described above.

More specifically, the pistons 37A, 37B have first piston walls 63A, 63B and second piston walls 64A, 64B disposed in the axial direction, and the piston walls 63A, 63B, and 64A, 64B are connected to each other by cylindrical inner circumferential walls 65A and 65B, respectively. Thus, circular spaces open to the radially outer side are respectively formed between the first piston walls 63A, 63B and the second piston walls 64A, 64B, and the circular spaces are partitioned into right and left halves in the axial direction by partition members 66A, 66B which are fixed to the inner circumferential surfaces of the outer wall of the cylinder chambers 38A, 38B, respectively. The spaces between the right-and-left separating wall 39 of the speed reducer case 11 and the second pistons walls 64, 64B are each referred to as a first operating chamber S1 (see FIG. 5) into which a high pressure oil is directly introduced, and the spaces between the partition members 66A, 66B and the first piston walls 63A, 63B are each referred to as a second operating chamber S2 (see FIG. 5) which communicates with the first operating chambers S1 via a through hole formed in each of the inner circumferential walls 65A, 65B. The space between the second piston walls 64A, 64B and the partition members 66A, 66B communicate with the atmosphere.

In the hydraulic brakes 60A, 60B, oil is introduced from a below-described hydraulic circuit 71 to the first operating chamber S1 and the second operating chamber S2, and thus the oil pressure which acts on the first piston walls 63A, 63B and the second piston walls 64A, 64B allows the fixed plates 35A, 35B and the rotary plates 36A, 36B to be pressed alternately. Consequently, a large pressure receiving area can be secured by the first and second piston walls 63A, 63B, and 64A, 64B on the right and left in the axial direction, and thus a large pressing force against the fixed plates 35A, 35B and the rotary plates 36A, 36B may be obtained without increasing the area of the pistons 37A, 37B in the radial direction.

In the case of the hydraulic brakes 60A, 60B, the fixed plates 35A, 35B are supported by the outer radial side supporting portion 34 which extends from the speed reducer case 11, while the rotary plates 36A, 36B are supported by the ring gears 24A, 24B. Thus, when both plates 35A, 35B and 36A, 36B are pressed by the pistons 37A, 37B, braking force acts on the ring gears 24A, 24B to stop due to friction coupling between the plates 35A, 35B and 36A, 36B, and then when the coupling caused by the pistons 37A, 37B is released, free rotation of the ring gears 24A, 24B is allowed.

In addition, a space portion is also secured between the connecting portions 30A, 30B of the ring gears 24A, 24B that face each other in the axial direction, and in the space portion, the one-way clutch 50 is disposed that allows power to be transmitted only in one way to the ring gears 24A, 24B, and stops transmission of power in the other way. The one-way clutch 50 is formed by interposing a great number of sprags 53 between the inner lace 51 and an outer laces 52, so that the inner lace 51 is configured to rotate integrally with the narrow diameter portion 29A, 29B of the ring gears 24A, 24B due to spline fitting. Additionally, the outer lace 52 is positioned and detent-stopped by the inner radial side supporting portion 40. The one-way clutch 50 is configured to be engaged to lock the rotation of the ring gears 24A, 24B when the vehicle 3 moves forward by the power of the motors 2A, 2B. More specifically, the one-way clutch 50 comes into an engaged state when the rotational power of the motors 2A, 2B in the forward direction (the rotation direction of the motors 2A, 2B when the vehicle 3 moves forward) is inputted to the rear wheels Wr, while being put in a disengaged state when the rotational power of the motors 2A, 2B in the rearward direction is inputted to the rear wheels Wr. The one-way clutch 50 comes into an engaged state when the rotational power of the rear wheels Wr side in the forward direction is inputted to the motors 2A, 2B, while being put in a disengaged state when the rotational power of the rear wheels Wr in the forward direction is inputted to the motors 2A, 2B.

In this manner, the rear-wheel drive device 1 of the present embodiment is provided with the one-way clutch 50 and the hydraulic brakes 60A, 60B in parallel on the power transmission path between the motors 2A, 2B and the rear wheels Wr.

Next, a hydraulic circuit constituting a hydraulic controller of the rear-wheel drive device 1 will be described with reference to FIGS. 5 to 8. A hydraulic circuit 71 is configured to supply oil to the first operating chambers S1 of the hydraulic brakes 60A, 60B via a low pressure oil passage switching valve 73 and a brake oil passage switching valve 74, while being configured to supply oil to a lubricating and cooling unit 91 of the motors 2A, 2B, the planetary gear speed reducers 12A, 12B via the low pressure oil passage switching valve 73, the oil being sucked through an inlet port 70a disposed in oil pan 80, and being discharged from the electric oil pump 70. The speed-reducer case 11 stores the oil which has been discharged from the electric oil pump 70, and has been supplied to the lubricating and cooling unit 91 of the motors 2A, 2B, the planetary gear speed reducers 12A, 12B. A lower portion of the planetary carriers 23A, 23B and a lower portion of the motors 2A, 2B are submerged in the oil. The electric oil pump 70 can be run (operated) by an electric motor 90 including a position sensorless brushless DC motor in at least two modes, i.e., a high pressure mode and a low pressure mode, and is controlled by the PID control. Reference symbol 92 indicates an oil temperature sensor for detecting an oil temperature of a brake oil passage 77.

The low pressure oil passage switching valve 73 is connected to a first line oil passage 75a on the electric oil pump 70 side that constitutes a line oil passage 75, a second line oil passage 75b on the brake oil passage switching valve 74 side that constitutes a line oil passage 75, a first low pressure oil passage 76a which communicates with the lubricating and cooling unit 91, and a second low pressure oil passage 76b which communicates with the lubricating and cooling unit 91. In addition, the low pressure oil passage switching valve 73 allows the first line oil passage 75a and the second line oil passage 75b to communicate with each other constantly, and includes a valve element 73a which allows the line oil passage 75 to selectively communicate with the first low pressure oil passage 76a or the second low pressure oil passage 76b; a spring 73b for spring biasing the valve element 73a in the direction (the right direction in FIG. 5) that allows the line oil passage 75 to communicate with the first low pressure oil passage 76a; and an oil chamber 73c for pressing the valve element 73a in the direction (the left direction in FIG. 5) that allows the line oil passage 75 to communicate with the second low pressure oil passage 76b, by the hydraulic pressure of the line oil passage 75. Consequently, the valve element 73a is spring biased by the spring 73b in the direction (the right direction in FIG. 5) that allows the line oil passage 75 and the first low pressure oil passage 76a to communicate with each other, while being pressed by the pressure of the oil in the line oil passage 75, which is inputted to the oil chamber 73c at the right end in the middle of FIG. 5 in the direction (the left direction in FIG. 5) that allows the line oil passage 75 and the second low pressure oil passage 76b to communicate with each other.

Figure 6A:
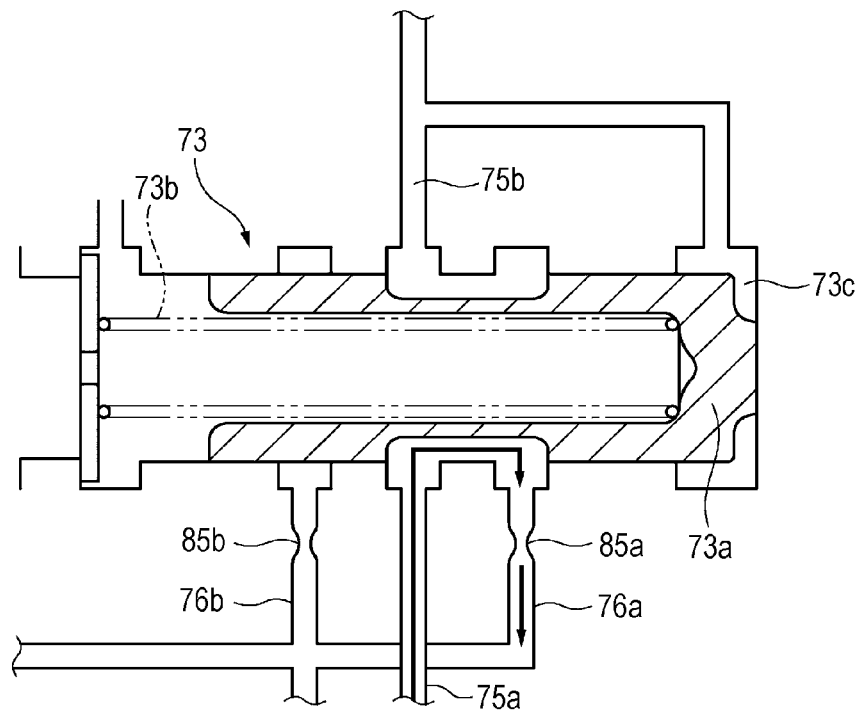
FIG. 6A is an illustrative diagram when a low pressure oil passage switching valve is at low pressure side.
Figure 6B:
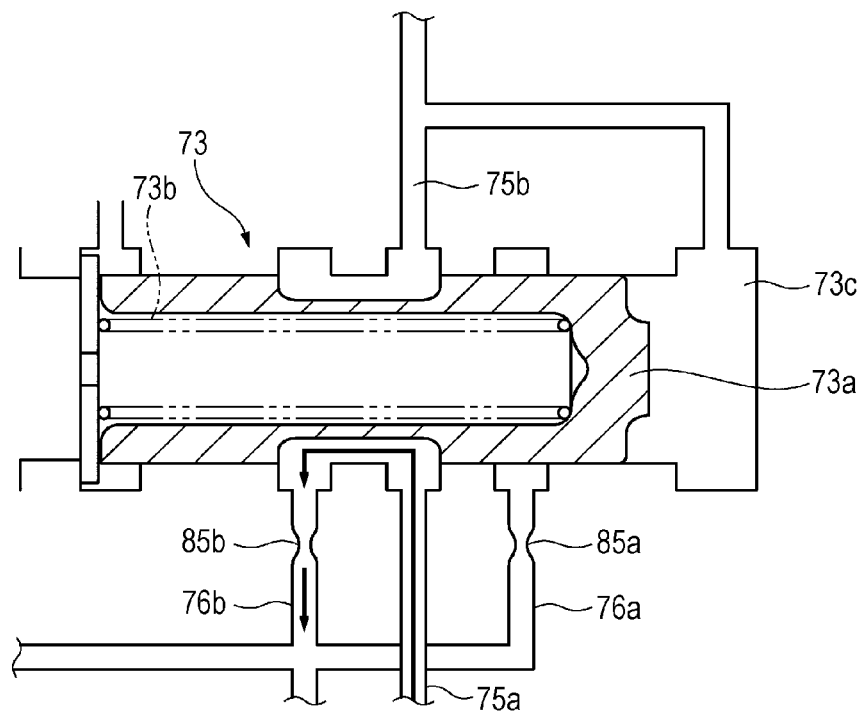
FIG. 6B is an illustrative diagram when the low pressure oil passage switching valve is at high pressure side.

Here, the bias force of the spring 73b is set so that the pressure of the oil in the line oil passage 75, which is inputted to the oil chamber 73c during the operation of the electric oil pump 70 in a low pressure mode does not cause the valve element 73a to move, and thus the line oil passage 75 is disconnected from the second low pressure oil passage 76b, but is allowed to communicate with the first low pressure oil passage 76a as illustrated in FIG. 6A (hereinafter, the position of the valve element 73a of FIG. 6A is referred to as the low-pressure side position), while the pressure of the oil in the line oil passage 75, which is inputted to the oil chamber 73c during the operation of the electric oil pump 70 in a high pressure mode causes the valve element 73a to move, and thus the line oil passage 75 is disconnected from the first low pressure oil passage 76a, but is allowed to communicate with the second low pressure oil passage 76b as illustrated in FIG. 6B (hereinafter, the position of the valve element 73a of FIG. 6B is referred to as the high-pressure side position).

The brake oil passage switching valve 74 is connected to the second line oil passage 75b constituting the line oil passage 75, the brake oil passage 77 connected to the hydraulic brakes 60A, 60B, and a high position drain 78 via a reservoir section 79. The brake oil passage switching valve 74 includes a valve element 74a for allowing the second line oil passage 75b and the brake oil passage 77 to communicate or disconnect from each other; a spring 74b for spring biasing the valve element 74a in the direction (the right direction in FIG. 5) that allows the second line oil passage 75b to be disconnected from the brake oil passage 77; and an oil chamber 74c for pressing the valve element 74a in the direction (the left direction in FIG. 5) that allows the brake oil passage 77 to communicate with the second line oil passage 75b, by the hydraulic pressure of the line oil passage 75. Consequently, the valve element 74a is spring biased by the spring 74b in the direction (the right direction in FIG. 5) that allows the second line oil passage 75b to be disconnected from the brake oil passage 77, while being pressed by the pressure of the oil in the line oil passage 75 which is inputted to the oil chamber 74c in the direction (the left direction in FIG. 5) that allows the second line oil passage 75b to communicate with the brake oil passage 77.

Figure 7A:
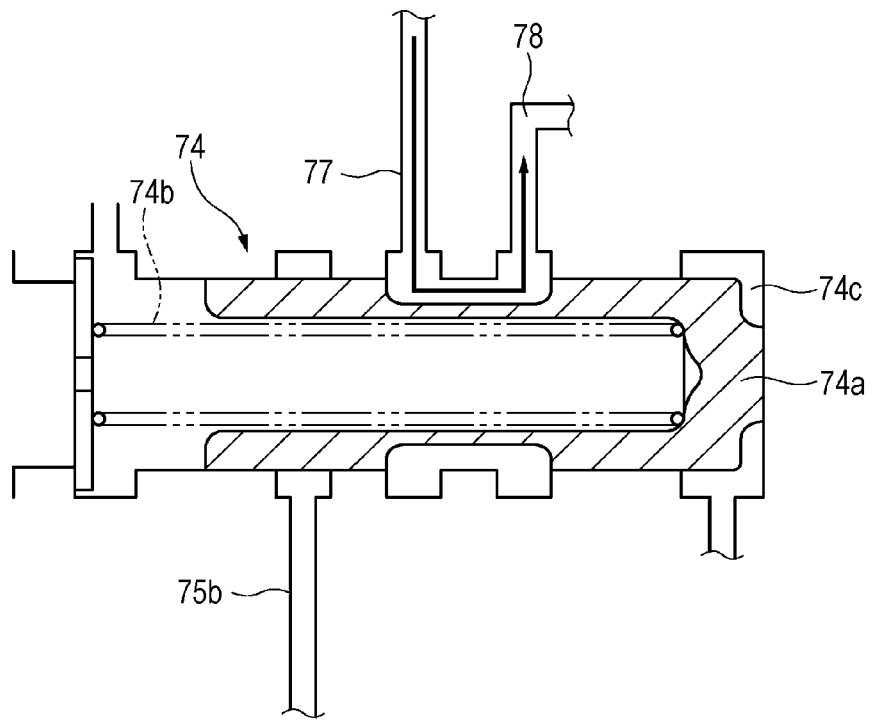
FIG. 7A is an illustrative diagram when a brake oil passage switching valve is in a valve closed position.
Figure 7B:
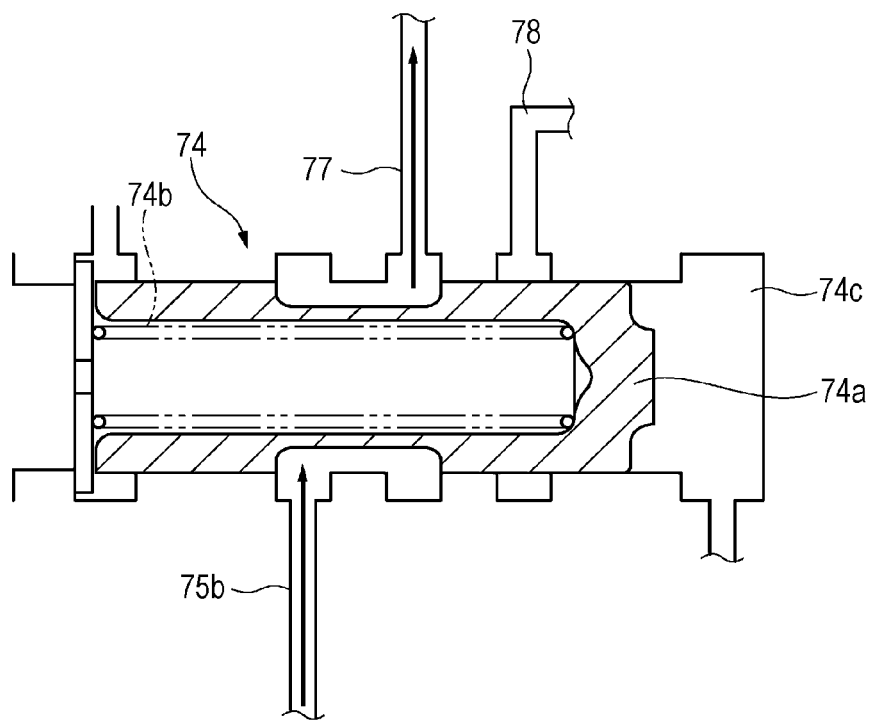
FIG. 7B is an illustrative diagram when the brake oil passage switching valve is in a valve open position.

The bias force of the spring 74b is set so that the pressure of the oil in the line oil passage 75, which is inputted to the oil chamber 74c during the operation of the electric oil pump 70 in a low pressure mode causes the valve element 74a to move from the valve closed position of FIG. 7A to the valve open position of FIG. 7B so that the brake oil passage 77 is disconnected from the high position drain 78, but is allowed to communicate with the second line oil passage 75b. That is to say, regardless of whether the electric oil pump 70 is run in a high pressure mode or in a low pressure mode, the pressure of the oil in the line oil passage 75 inputted to the oil chamber 74c exceeds the bias force of the spring 74b, and thus the brake oil passage 77 is disconnected from the high position drain 78, but is allowed to communicate with the second line oil passage 75b.

In a state where the second line oil passage 75b and the brake oil passage 77 are disconnected from each other, the hydraulic brakes 60A, 60B communicate with the brake oil passage 77, and the reservoir section 79 via the high position drain 78. Here, the reservoir section 79 is disposed at a position higher than the oil pan 80 in the vertical direction, and more preferably, the top of the reservoir section 79 in the vertical direction is disposed at a position higher than the mid-point between the top and bottom of the first operating chambers S1 of the hydraulic brakes 60A, 60B in the vertical direction. Consequently, in a state where the brake oil passage switching valve 74 is closed, the oil that has been stored in the first operating chambers S1 of the hydraulic brakes 60A, 60B is not directly discharged to the oil pan 80, but is discharged to the reservoir section 79 and stored therein. Overflowing oil from the reservoir unit 79 is designed to be discharged to the oil pan 80. A reservoir section side end portion 78a of the high position drain 78 is connected to the bottom surface of the reservoir section 79.

The oil chamber 74c of the brake oil passage switching valve 74 is made to be connectable to the second line oil passage 75b constituting the line oil passage 75 via a pilot oil passage 81 and a solenoid valve 83. The solenoid valve 83 is formed of a three-way electromagnetic valve which is controlled by a control unit 8, and when a solenoid 174 (see FIG. 8) is not energized with the solenoid valve 83 by the control unit 8, the second line oil passage 75b is connected to the pilot oil passage 81 so that the oil pressure of the line oil passage 75 is inputted to the oil chamber 74c.

As illustrated in FIG. 8, the solenoid valve 83 includes a three-way valve member 172; the solenoid 174 which is formed in a case member 173 and is magnetized in response to receiving a power supplied via a cable (not shown); a solenoid valve body 175 which is pulled in the right direction in response to receiving magnetizing power of the solenoid 174; a solenoid spring 176 which is housed in a spring holding recessed section 173a formed in the center of the case member 173, and applies a force to the solenoid valve body 175 in the left direction; and a guide member 177 which is provided in the three-way valve member 172, and slidably guides advancing and retracting of the solenoid valve body 175.

The three-way valve member 172 is a member in a substantially closed-end cylindrical shape, and includes a right side recessed hole 181 which is formed along the center line of the three-way valve member 172 from the right end to an approximately middle portion; a left side recessed hole 182 which is formed along the center line of the three-way valve member 172 from the left end to a neighborhood of the right side recessed hole 181; a first radial hole 183 which is formed between the right side recessed hole 181 and the left side recessed hole 182, in the direction perpendicular to the center line; a second radial hole 184 which is formed in the direction perpendicular to the center line, and communicates with the approximately middle portion of the right side recessed hole 181; a first axial hole 185 which is formed along the center line, and communicates with the left side recessed hole 182 and the first radial hole 183; and a second axial hole 186 which is formed along the center line, and communicates with the first radial hole 183 and the right side recessed hole 181.

A ball 187 for opening and closing the first axial hole 185 is inserted into the bottom of the left side recessed hole 182 of the three-way valve member 172, the ball 187 being movable in the horizontal direction, and a cap 188 for preventing separation of the ball 187 is fitted into the entry of the left side recessed hole 182. In the cap 188, a through hole 188a which communicates with the first axial hole 185 is formed along the center line.

The second axial hole 186 is opened or closed by contact or non-contact of the root portion of a projection for opening and closing 175a, which is formed at the left end of the solenoid valve body 175 which moves horizontally. The ball 187 for opening and closing the first axial hole 185 is moved horizontally by the distal end of projection for opening and closing 175a of the solenoid valve body 175 which moves horizontally.

Figure 8A:
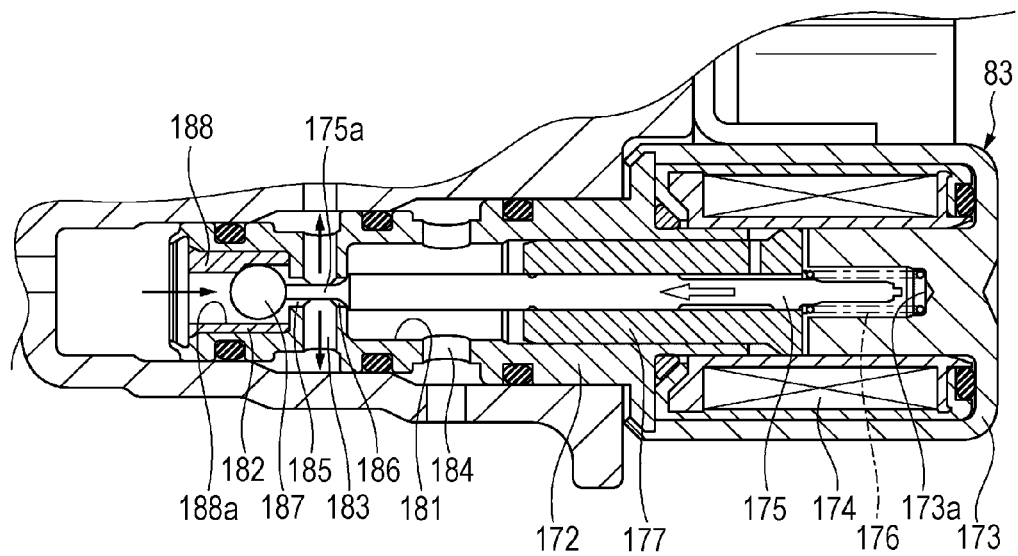
FIG. 8A is an illustrative diagram when a solenoid valve is not energized.

Then by setting the solenoid valve 83 to not energize (not supply power to) the solenoid 174, the solenoid valve body 175 moves to the left in response to receiving the bias force of the solenoid spring 176 as illustrated in FIG. 8A. Consequently, the distal end of the projection for opening and closing 175a of the solenoid valve body 175 pushes the ball 187, and thus the first axial hole 185 is released. At the same time, the root portion of the projection for opening and closing 175a of the solenoid valve body 175 comes into contact with the second axial hole 186, and consequently the second axial hole 186 is blocked. Thus, the second line oil passage 75b which constitutes the line oil passage 75 communicates with the oil chamber 74c from the first axial hole 185 and the first radial hole 183 via the pilot oil passage 81 (hereinafter, the position of the solenoid valve body 175 in FIG. 8A may be referred to as a valve open position).

Figure 8B:
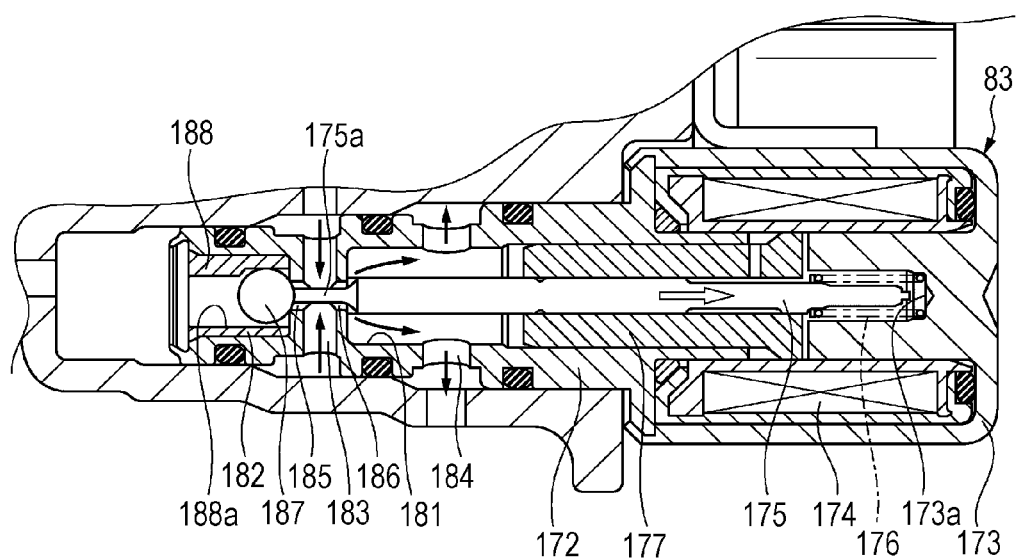
FIG. 8B is an illustrative diagram when the solenoid valve is energized.

By energizing (supplying power to) the solenoid 174, the solenoid valve body 175 moves to the right against the bias force of the solenoid spring 176 in response to receiving magnetizing power of the solenoid 174 as illustrated in FIG. 8B. Consequently, the oil pressure from the through hole 188a pushes the ball 187, and thus the first axial hole 185 is blocked. At the same time, the root portion of the projection for opening and closing 175a of the solenoid valve body 175 moves away from the second axial hole 186, and thus the second axial hole 186 is released. Thus, the oil which has been stored in the oil chamber 74c is discharged to the oil pan 80 via the first radial hole 183, the second axial hole 186, and the second radial hole 184 so that the second line oil passage 75b and the pilot oil passage 81 are blocked (hereinafter, the position of the solenoid valve body 175 in FIG. 8B may be referred to as a valve closed position).

Returning to FIG. 5, in the hydraulic circuit 71, the first low pressure oil passage 76a and the second low pressure oil passage 76b merge in the downstream, and thus form the common low pressure common oil passage 76c. The merging section is provided with a relief valve 84 which is connected thereto for discharging the oil in the common low pressure oil passage 76c to the oil pan 80 via the relief drain 86 to reduce the oil pressure in the case where the pressure of the common low pressure oil passage 76c exceeds a predetermined pressure.

Here, as illustrated in FIG. 6, orifices 85a, 85b are formed as passage resistance units in the first low pressure oil passage 76a and the second low pressure oil passage 76b, respectively, with the orifice 85a of the first low pressure oil passage 76a being greater than the orifice 85b of the second low pressure oil passage 76b in diameter. Therefore, the passage resistance of the second low pressure oil passage 76b is greater than the passage resistance of the first low pressure oil passage 76a, and thus the amount of pressure reduction in the second low pressure oil passage 76b during the operation of the electric oil pump 70 in a high pressure mode is greater than the amount of pressure reduction in the first low pressure oil passage 76a during the operation of the electric oil pump 70 in a low pressure mode. Consequently, the oil pressures of the common low pressure oil passage 76c in a high pressure mode and a low pressure mode are approximately the same.

In this manner, in the low pressure oil passage switching valve 73 which is connected to the first low pressure oil passage 76a and the second low pressure oil passage 76b, the bias force of the spring 73b exceeds the oil pressure in the oil chamber 73c during the operation of the electric oil pump 70 in a low pressure mode. Consequently, the valve element 73a is set to be located at a low pressure-side position due to the bias force of the spring 73b, and thus the line oil passage 75 is disconnected from the second low pressure oil passage 76b, but is allowed to communicate with the first low pressure oil passage 76a. The oil flowing through the first low pressure oil passage 76a is reduced in pressure by receiving passage resistance in the orifice 85a, and flows through the common low pressure oil passage 76c to the lubricating and cooling unit 91. On the other hand, during the operation of the electric oil pump 70 in a high pressure mode, the oil pressure in the oil chamber 73c exceeds the bias force of the spring 73b. Consequently, the valve element 73a is set to be located at a high pressure-side position against the bias force of the spring 73b, and thus the line oil passage 75 is disconnected from the first low pressure oil passage 76a and is allowed to communicate with the second low pressure oil passage 76b. The oil flowing through the second low pressure oil passage 76b is reduced in pressure by receiving passage resistance in the orifice 85a, and flows through the common low pressure oil passage 76c to the lubricating and cooling unit 91.

Consequently, when the electric oil pump 70 shifts from a low pressure mode to a high pressure mode, active oil passage is automatically changed from an oil passage with a small passage resistance to an oil passage with a large passage resistance in accordance with a change in the oil pressure of the line oil passage 75. An excessive oil supply to the lubricating and cooling unit 91 in a high pressure mode may be suppressed.

In addition, the oil passage from the common low pressure oil passage 76c to the lubricating and cooling unit 91 is provided with a plurality of orifices 85c as other passage resistance units. The plurality of orifices 85c are provided so that the minimum passage sectional area of the orifice 85a of the first low pressure oil passage 76a is smaller than the minimum passage sectional area of the plurality of orifices 85c. That is to say, the passage resistance of the orifice 85a of the first low pressure oil passage 76a is set to be smaller than the passage resistances of the plurality of orifices 85c. In this case, the minimum passage sectional area of the plurality of orifices 85c is the sum of the minimum passage sectional area of each orifice 85c. Thus, the orifice 85a of the first low pressure oil passage 76a and the orifice 85b of the second low pressure oil passage 76b allow a desired amount of flow to be adjusted and flown.

Here, the control unit 8 (see FIG. 1) is configured to perform various controls of the entire vehicle, and data such as a vehicle speed, a steering angle, an accelerator pedal opening AP, a shift position, SOC, an oil temperature, rotational number of the motors 2A, 2B are inputted to the control unit 8, while a signal for controlling the internal combustion engine 4, signals for controlling the motors 2A, 2B, signals indicating a power generation state, a charge state, a discharge state, and the like in the battery 9, a control signal to the solenoid 174 of the solenoid valve 83, a control signal for controlling the electric oil pump 70 are outputted from the control unit 8.

That is to say, the control unit 8 has at least a function as a motor control device for controlling the motors 2A, 2B, and a function as a connection-disconnection unit control device for controlling the hydraulic brakes 60A, 60B as connection-disconnection units. The control unit 8 as a connection-disconnection unit control device controls the electric oil pump 70 and the solenoid 174 of the solenoid valve 83 based on a driving state of the motors 2A, 2B and/or a driving command (driving signal) for the motors 2A, 2B.

Figure 5:
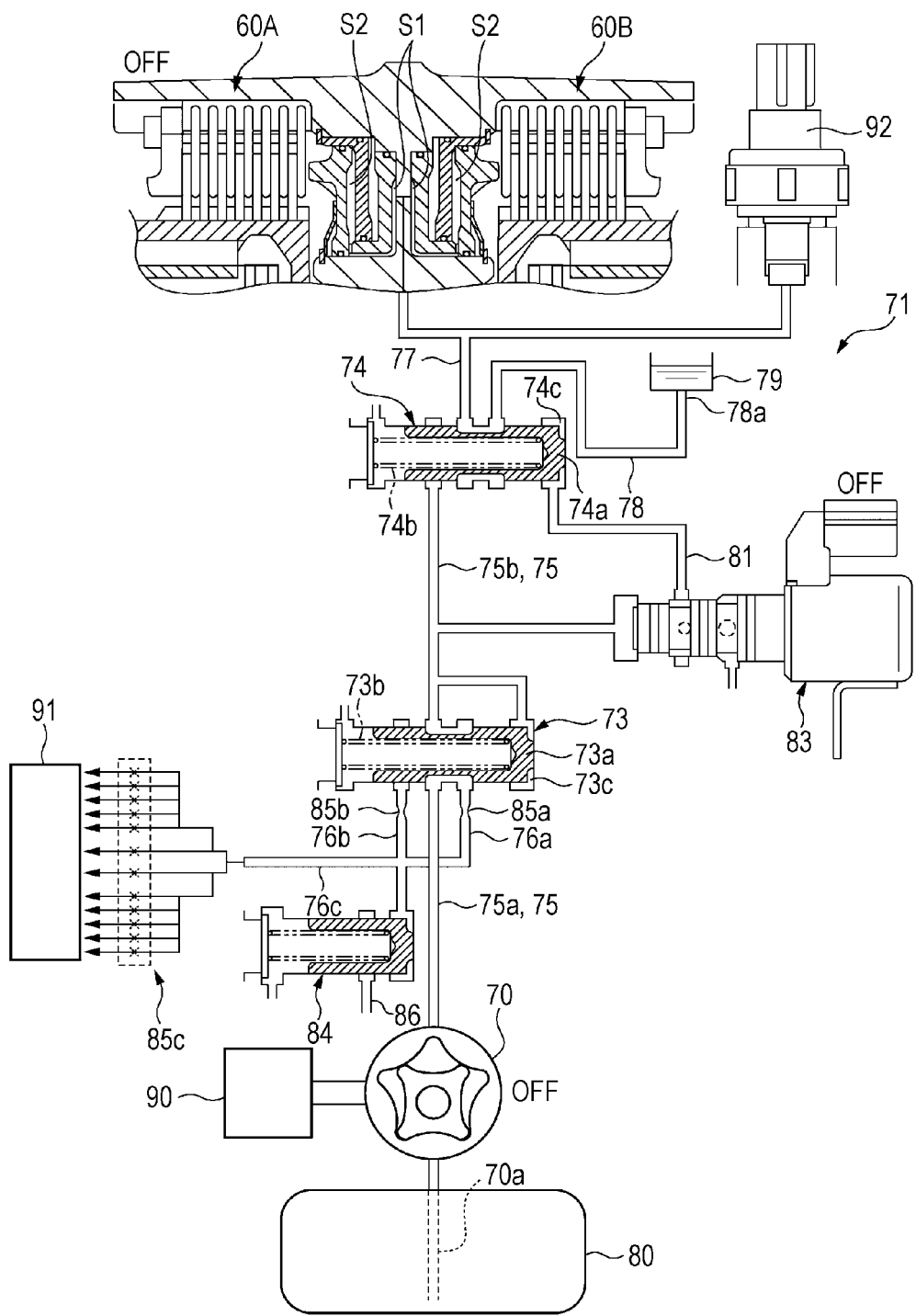
FIG. 5 is a hydraulic circuit diagram of a hydraulic controller to control an hydraulic brake in a state where a hydraulic pressure is not supplied.

Next, the operation of the hydraulic circuit 71 of the rear-wheel drive device 1 will be described. FIG. 5 illustrates the hydraulic circuit 71 in a state where the oil brakes 60A, 60B are released while the vehicle is stopped. In the state, the control unit 8 does not operate the electric oil pump 70. Thus, the valve element 73a of the low pressure oil passage switching valve 73 is set to be located at a low-pressure side position, and the valve element 74a of the brake oil passage switching valve 74 is located in a valve closed position, and an oil pressure is not supplied to the hydraulic circuit 71.

Figure 9:
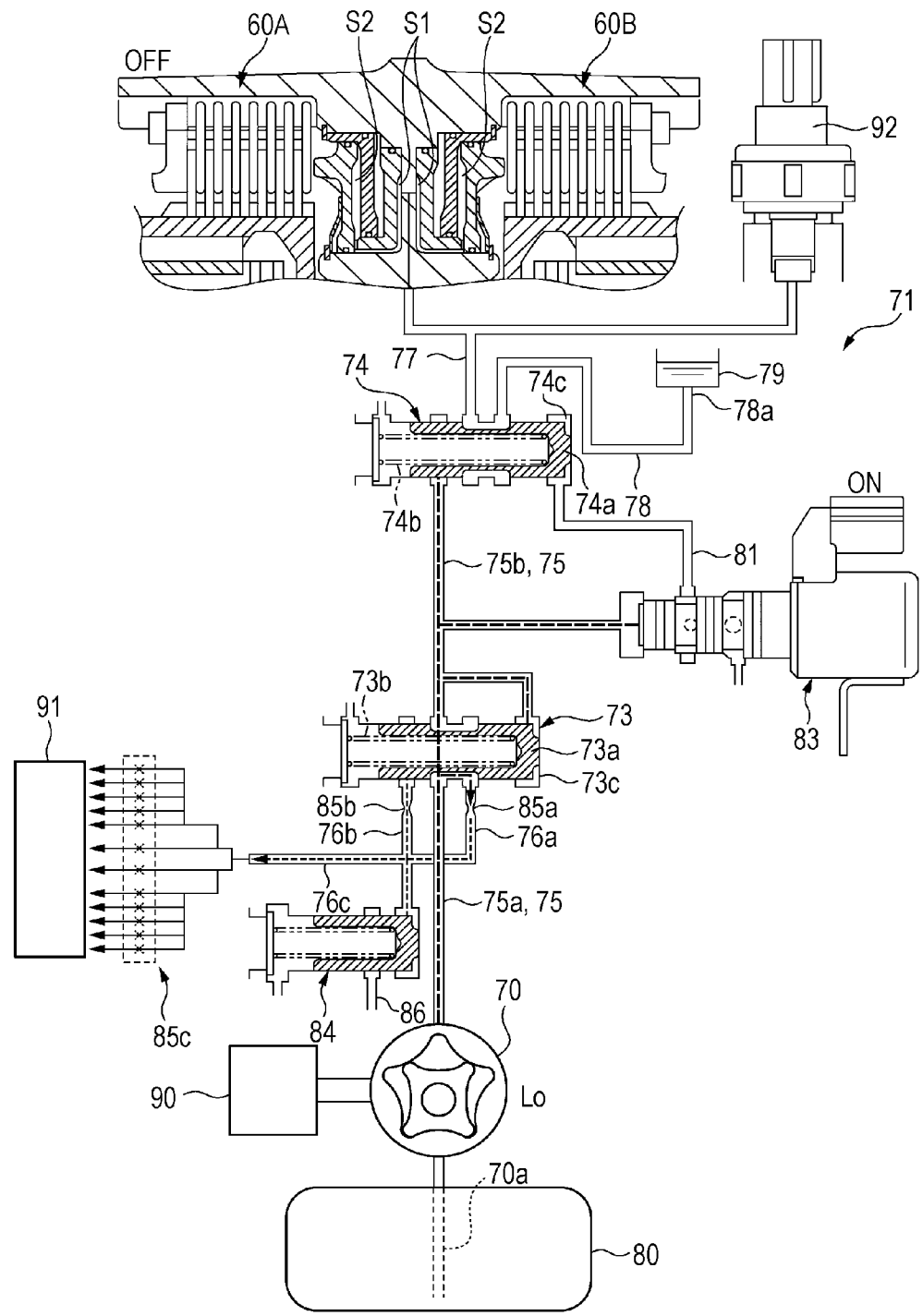
FIG. 9 is a hydraulic circuit diagram of the hydraulic controller in a released state (EOP: low pressure mode) of the hydraulic brake while a vehicle is running.

FIG. 9 illustrates a state where the oil brakes 60A, 60B are released while a vehicle is running. In this state, the control unit 8 operates the electric oil pump 70 in a low pressure mode. In addition, the control unit 8 energizes the solenoid 174 of the solenoid valve 83, and thus the second line oil passage 75b is disconnected from the pilot oil passage 81. Thus, the valve element 74a of the brake oil passage switching valve 74 is set to be located at a valve closed position due to the bias force of the spring 74b. Thus the second line oil passage 75b is disconnected from the brake oil passage 77, while the brake oil passage 77 and the high position drain 78 may be communicated with each other, and thus the hydraulic brakes 60A, 60B are released. The brake oil passage 77 is then connected to the reservoir section 79 via the high position drain 78.

In the low pressure oil passage switching valve 73, the bias force of the spring 73b is greater than the oil pressure of the line oil passage 75, which is inputted to the oil chamber 73c at the right end in the middle of FIG. 9, during the operation of the electric oil pump 70 in a low pressure mode. Thus the valve element 73a is set to be located at a low-pressure side position, and the line oil passage 75 is disconnected from the second low pressure oil passage 76b, but is allowed to communicate with the first low pressure oil passage 76a. Thus, the oil of the line oil passage 75 is reduced in pressure by the orifice 85a via the first low pressure oil passage 76a, and is supplied to the lubricating and cooling unit 91.

Figure 10:
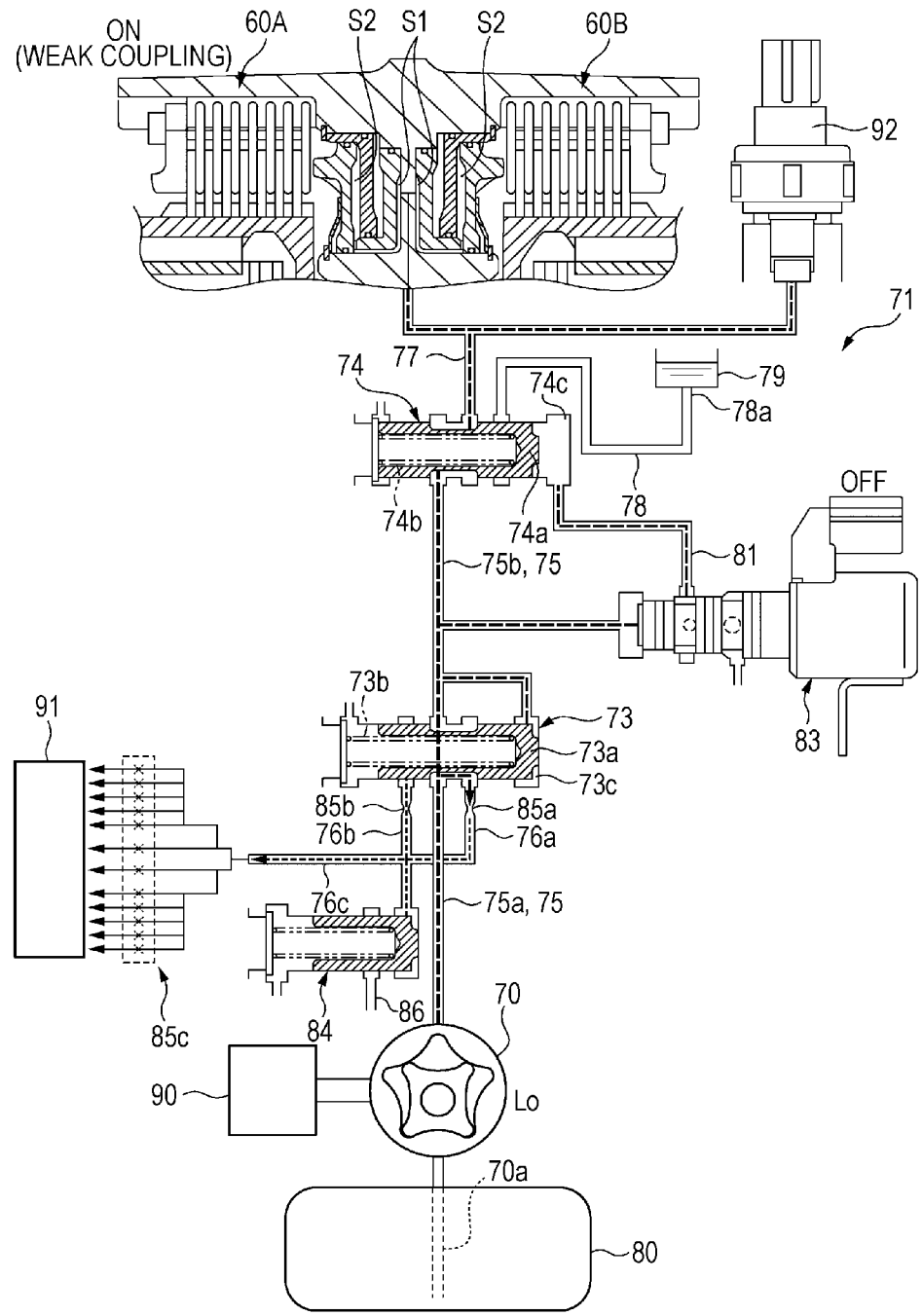
FIG. 10 is a hydraulic circuit diagram of the hydraulic controller in a weakly coupled state (EOP: low pressure mode) of the hydraulic brake.

FIG. 10 illustrates the hydraulic circuit 71 with the hydraulic brakes 60A, 60B in a weakly coupled state. The weak coupling allows power to be transmitted, however, the coupling force in the weak coupling is weak with respect to the coupling force of the hydraulic brakes 60A, 60B that are in a coupled state. In this case, the control unit 8 operates the electric oil pump 70 in a low pressure mode. The control unit 8 sets the solenoid valve 83 to not energize the solenoid 174, and consequently, the oil pressure of the second line oil passage 75b is inputted to the oil chamber 74c of the brake oil passage switching valve 74. Thus, the oil pressure in the oil chamber 74c exceeds the bias force of the spring 74b, and the valve element 74a is set to be located at a valve open position. The brake oil passage 77 is disconnected from the high position drain 78, and is allowed to communicate with the second low pressure oil passage 75a, and thus the hydraulic brakes 60A, 60B are set in a weakly coupled state.

In the low pressure oil passage switching valve 73, similarly to the case of release of the hydraulic brakes 60A, 60B, the bias force of the spring 73b is greater than the oil pressure of the line oil passage 75, which is inputted to the oil chamber 73c at the right end in the middle of FIG. 9, during the operation of the electric oil pump 70 in a low pressure mode. Thus the valve element 73a is set to be located at a low-pressure side position, and the line oil passage 75 is disconnected from the second low pressure oil passage 76b, but is allowed to communicate with the first low pressure oil passage 76a. Thus, the oil of the line oil passage 75 is reduced in pressure by the orifice 85a via the first low pressure oil passage 76a, and is supplied to the lubricating and cooling unit 91.

Figure 11:
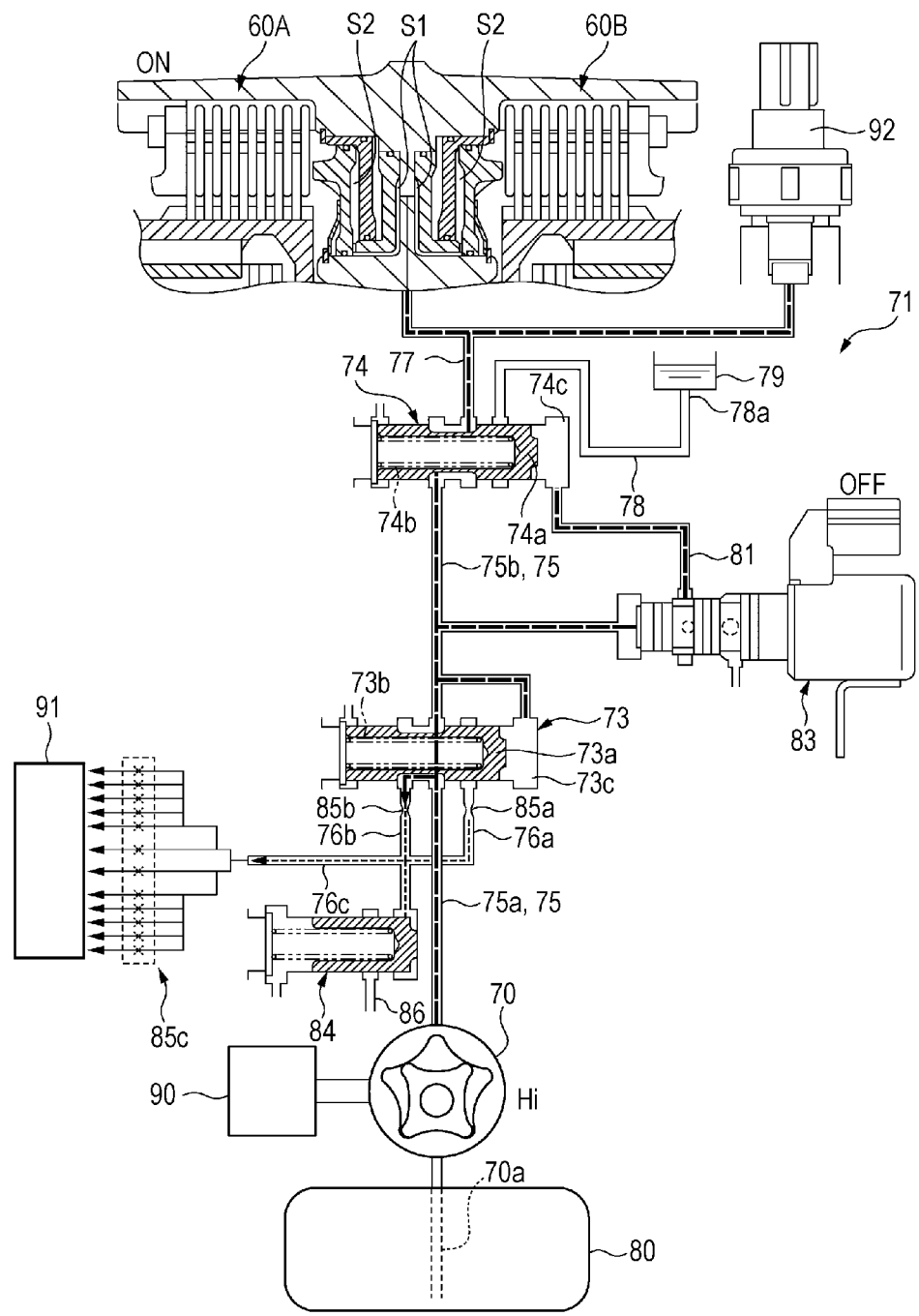
FIG. 11 is a hydraulic circuit diagram of the hydraulic controller in a coupled state (EOP: high pressure mode) of the hydraulic brake.

FIG. 11 illustrates the hydraulic circuit 71 with the hydraulic brakes 60A, 60B in a coupled state. In this case, the control unit 8 operates the electric oil pump 70 in a high pressure mode. The control unit 8 sets the solenoid valve 83 to not energize the solenoid 174, and the oil pressure of the second line oil passage 75b is inputted to the oil chamber 74c at the right end of the brake oil passage switching valve 74. Thus, the oil pressure in the oil chamber 74c exceeds the bias force of the spring 74b, and the valve element 74a is set to be located at a valve open position. The brake oil passage 77 is disconnected from the high position drain 78, and is allowed to communicate with the second low pressure oil passage 75a, and thus the hydraulic brakes 60A, 60B are set in a coupled state.

In the low pressure oil passage switching valve 73, the oil pressure of the line oil passage 75 inputted to the oil chamber 73c at the right end in the middle of FIG. 9 during the operation of the electric oil pump 70 in a high pressure mode is greater than the bias force of the spring 73b. Consequently, the valve element 73a is set to be located at a high-pressure side position, and thus the line oil passage 75 is disconnected from the first low pressure oil passage 76a and is allowed to communicate with the second low pressure oil passage 76b. Thus, the oil of the line oil passage 75 is reduced in pressure by the orifice 85b via the second low pressure oil passage 76b, and is supplied to the lubricating and cooling unit 91.

In this manner, the control unit 8 releases or couples the hydraulic brakes 60A, 60B by controlling the operation mode (operating state) of the electric oil pump 70 and the opening and closing of the solenoid valve 83, and sets the motors 2A, 2B, and the rear wheels Wr in a disconnected state or a connected state, while being able to control the coupling force of the hydraulic brakes 60A, 60B.

Figure 12:
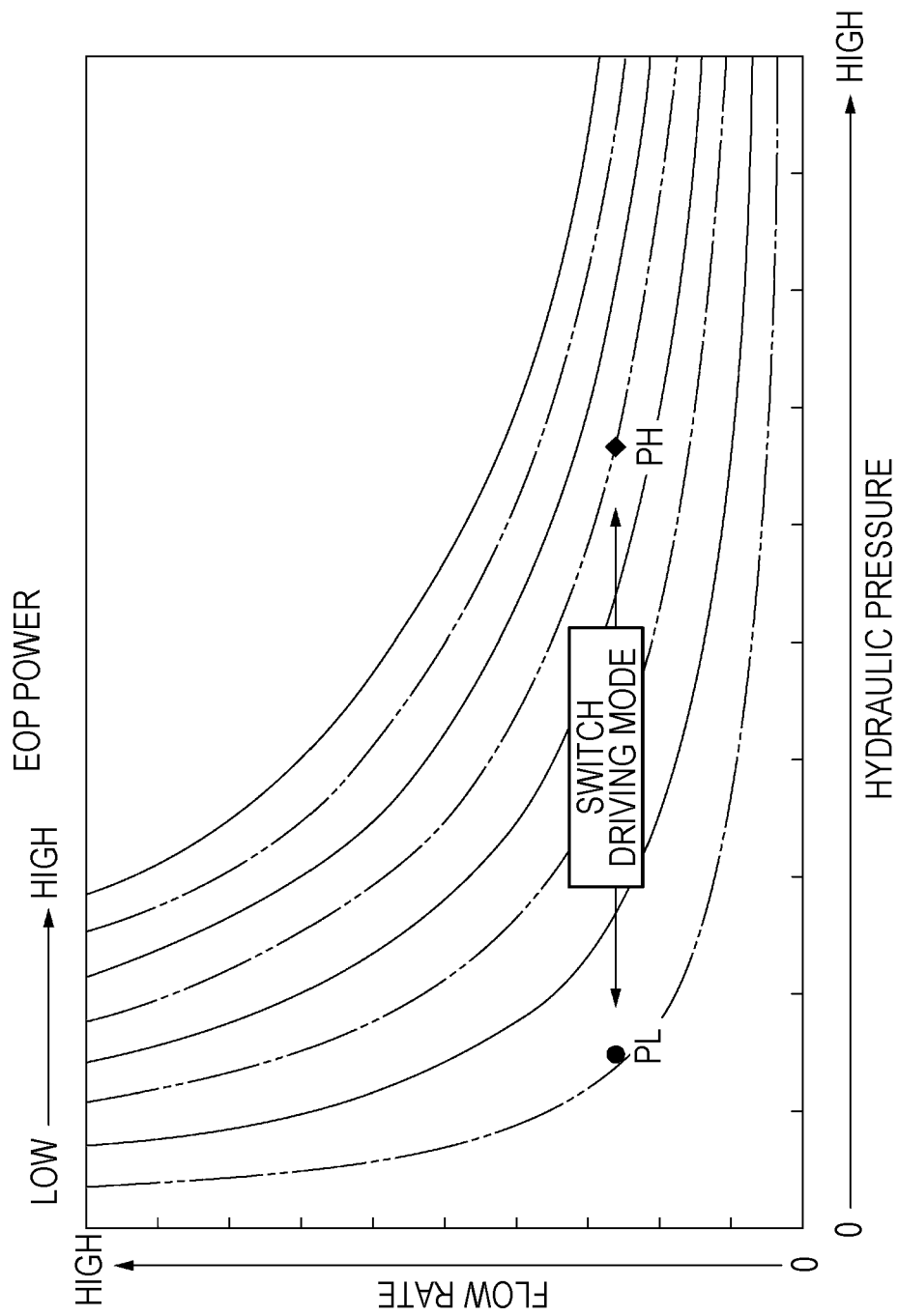
FIG. 12 is a graph illustrating the load characteristic of an electric oil pump.

FIG. 12 a graph illustrating the load characteristic of the electric oil pump 70. As illustrated in FIG. 12, in contrast to a high pressure mode (oil pressure PH), in a low pressure mode (oil pressure PL), the power of the electric oil pump 70 may be reduced to approximately ¼ to ⅕ the initial power, while maintaining the supply flow rate of oil. That is to say, in a low pressure mode, the load of the electric oil pump 70 is small, and in contrast to a high pressure mode, the power consumption of the motor 90 which drives the electric oil pump 70 may be reduced.

FIG. 13 a table listing relationship between the front-wheel drive device 6 and the rear-wheel drive device 1 in each vehicle state, in combination with an operating state of the motors 2A, 2B and a state of the hydraulic circuit 71. In FIG. 13, a front unit represents the front-wheel drive device 6, a rear unit represents the rear-wheel drive device 1, a rear motor represents the motors 2A, 2B, EOP represents the electric oil pump 70, SOL represents the solenoid 174, OWC represents the one-way clutch 50, and BRK represents the hydraulic brakes 60A, 60B. FIGS. 14 to 19 each illustrate a speed lever analogy diagram of the rear-wheel drive device 1 in each state. Letters S, C on the left side respectively represent the sun gear 21A of the planetary-gear speed reducer 12A coupled to the motor 2A, and the planetary carrier 23A connected to the axle 10A. Letters S, C on the right side respectively represent the sun gear 21B of the planetary-gear speed reducer 12B coupled to the motor 2B, and the planetary carrier 23B connected to the axle 10B. Letter R represents the ring gears 24A, 24B, BRK represents the hydraulic brakes 60A, 60B, and OWC represents the one-way clutch 50. In the following description, the rotational direction of the sun gears 21A, 21B driven by the motors 2A, 2B during forward travel of the vehicle is defined as the forward direction. In FIGS. 14 to 19, the vehicle in a stopped state moves upward with the rotation in the forward direction, and moves downward with the rotation in the reverse direction. An up arrow indicates a torque in the forward direction, and a down arrow indicates a torque in the reverse direction.

Figure 14:
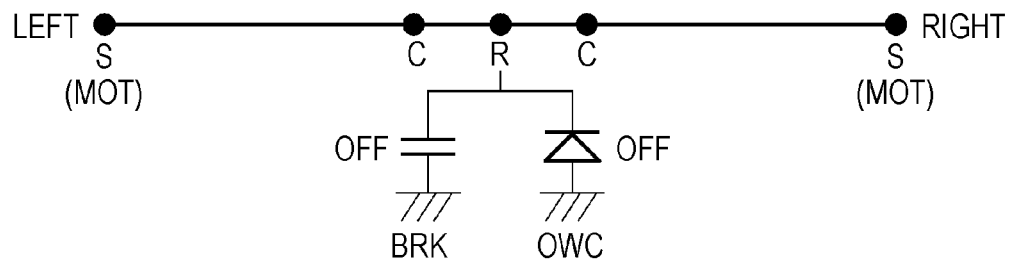
FIG. 14 is a velocity lever analogy diagram of the rear-wheel drive device while a vehicle is stopped.

During a stop of the vehicle, neither the front-wheel drive device 6 nor the rear-wheel drive device 1 is driven. Consequently, as illustrated in FIG. 14, the motors 2A, 2B of the rear-wheel drive device 1 are stopped, and the axles 10A, 10B are also stopped, and thus no torque is acting on any elements. While the vehicle 3 is stopped, as illustrated in FIG. 5, in the hydraulic circuit 71, the electric oil pump 70 is not in operation, and the solenoid 174 of the solenoid valve 83 is not energized, however, because an oil pressure is not supplied, the hydraulic brakes 60A, 60B are released (OFF). Because the motors 2A, 2B are not driven, the one-way clutch 50 is not engaged (OFF).

Figure 15:
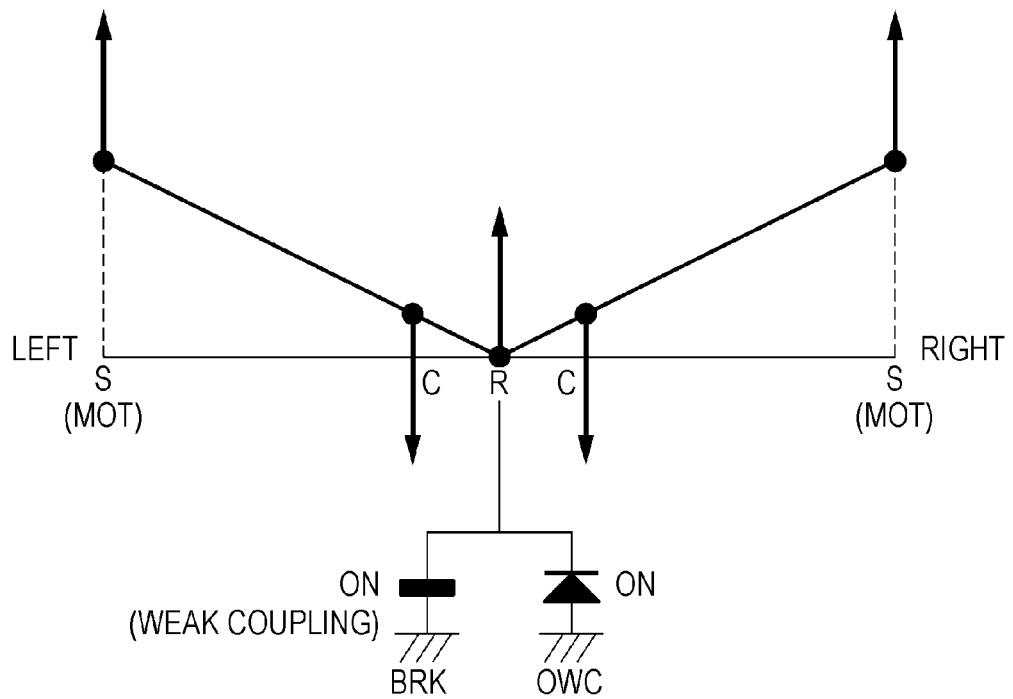
FIG. 15 is a speed lever analogy diagram of the rear-wheel drive device during forward travel of a vehicle at a low speed.

Then after the ignition is turned on, while the vehicle is moving forward at a low speed with efficient motor control such as EV start or EV cruise, the vehicle is rear-wheel driven by the rear-wheel drive device 1. As illustrated in FIG. 15, when the vehicle is power driven so that the motors 2A, 2B rotate in the forward direction, a torque in the forward direction is applied to the sun gears 21A, 21B. At this point, as described above, the one-way clutch 50 is engaged, and the ring gears 24A, 24B are locked. Consequently, the planetary carriers 23A, 23B rotate in the forward direction, and the vehicle moves forward. The running resistance from the axles 10A, 10B acts on the planetary carriers 23A, 23B in the reverse direction. Thus, at the start of the vehicle 3, by increasing the torque of the motors 2A, 2B after the ignition is turned on, the one-way clutch 50 is mechanically engaged and the ring gears 24A, 24B are locked.

At this point, as illustrated in FIG. 10, in the hydraulic circuit 71, the electric oil pump 70 operates in a low pressure mode (Lo), the solenoid 174 of the solenoid valve 83 is not energized (OFF), and the hydraulic brakes 60A, 60B are in a weakly coupled state. In this manner, when the rotational power of the motors 2A, 2B in the forward direction is inputted to the rear wheels Wr, the one-way clutch 50 comes into an engaged state, and power transmission may be achieved only by the one-way clutch 50. However, by establishing a connected state between the motors 2A, 2B, and the rear wheels Wr by setting the hydraulic brakes 60A, 60B in a weakly coupled state, which are provided in parallel with the one-way clutch 50, even when the one-way clutch 50 comes into a disengaged state because an input of the rotational power from the motors 2A, 2B in the forward direction is temporarily dropped, a power transmission failure between the motors 2A, 2B, and the rear wheels Wr may be prevented. In addition, when a drive mode is shifted to the below-described regenerative deceleration, rotational number control for establishing a connected state between the motors 2A, 2B, and the rear wheels Wr is not needed. The coupling force of the hydraulic brakes 60A, 60B at this point is weak compared with the coupling force at the time of regenerative deceleration or reverse travel described below. By reducing the coupling force of the hydraulic brakes 60A, 60B when the one-way clutch 50 is in an engaged state lower than the coupling force of the hydraulic brakes 60A, 60B when the one-way clutch 50 is in a disengaged state, the energy consumption for coupling the hydraulic brakes 60A, 60B is reduced. Even in this state, as described above, the oil of the line oil passage 75 is reduced in pressure by the orifice 85a via the first low pressure oil passage 76a, and is supplied to the lubricating and cooling unit 91 so that lubrication and cooling is performed by the lubricating and cooling unit 91.

Figure 16:
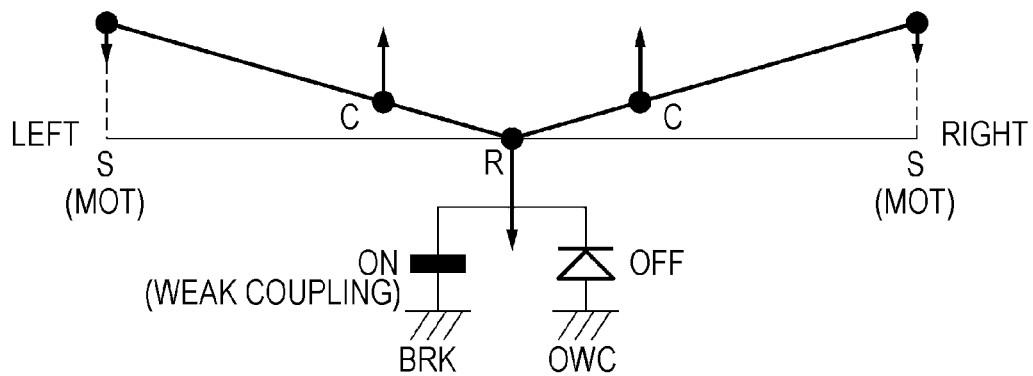
FIG. 16 is a speed lever analogy diagram of the rear-wheel drive device during forward travel of a vehicle at a middle speed.

As the vehicle is accelerated, and is shifted from a low speed forward travel state to a medium speed forward travel state with better engine efficiency, rear-wheel drive by the rear-wheel drive device 1 is replaced by front-wheel drive by the front-wheel drive device 6. As illustrated in FIG. 16, when the power drive of the motors 2A, 2B is stopped, a torque in the forward direction, as a momentum for the forward move, acts on the planetary carriers 23A, 23B from the axles 10A, 10B, and thus the one-way clutch 50 comes into a disengaged state as described above.

At this point, as illustrated in FIG. 10, in the hydraulic circuit 71, the electric oil pump 70 operates in a low pressure mode (Lo), the solenoid 174 of the solenoid valve 83 is not energized (OFF), and the hydraulic brakes 60A, 60B are in a weakly coupled state. In this manner, when the rotational power of the rear wheels Wr in the forward direction is inputted to the motors 2A, 2B side, the one-way clutch 50 comes into a disengaged state, and power transmission may not be achieved only by the one-way clutch 50. However, by establishing a connected state between the motors 2A, 2B, and the rear wheels Wr by setting the hydraulic brakes 60A, 60B in a weakly coupled state, which are provided in parallel with the one-way clutch 50, a power transmissible state may be maintained between the motors 2A, 2B, and the rear wheels Wr, and thus when a drive mode is shifted to the below-described regenerative deceleration, rotational number control is not needed. The coupling force of the hydraulic brakes 60A, 60B at this point is also weak compared with the coupling force at the time of regenerative deceleration or reverse travel described below. Furthermore, in this state, as described above, the oil of the line oil passage 75 is reduced in pressure by the orifice 85a via the first low pressure oil passage 76a, and is supplied to the lubricating and cooling unit 91 so that lubrication and cooling is performed by the lubricating and cooling unit 91.

During the forward travel of the vehicle at a medium speed, setting the hydraulic brakes 60A, 60B in a weakly coupled state causes the motors 2A, 2B to be dragged, and thus a negative torque which accompanies the dragging of the motors 2A, 2B is generated in the rear wheels Wr. In the present embodiment, a negative torque generated in the rear wheels Wr is counteracted by loss reduction control described below.

Figure 17:
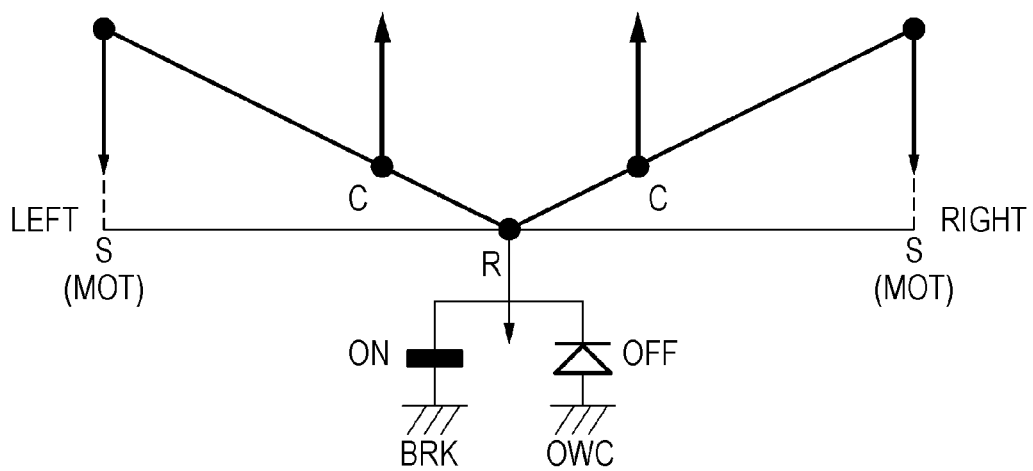
FIG. 17 is a speed lever analogy diagram of the rear-wheel drive device during regenerative deceleration of a vehicle.

When the motors 2A, 2B are regeneratively driven in a state of FIG. 15 or 16, as illustrated in FIG. 17, a torque in the forward direction, as a momentum for the forward move, acts on the planetary carriers 23A, 23B from the axles 10A, 10B, and thus the one-way clutch 50 comes into a disengaged state as described above.

At this point, as illustrated in FIG. 11, in the hydraulic circuit 71, the electric oil pump 70 operates in a high pressure mode (Hi), the solenoid 174 of the solenoid valve 83 is not energized (OFF), and the hydraulic brakes 60A, 60B are in a coupled state (ON). Consequently, the ring gears 24A, 24B are locked, while a regenerative braking torque in the reverse direction acts on the motors 2A, 2B, and thus regenerative deceleration is performed on the motors 2A, 2B. In this manner, when the rotational power of the rear wheels Wr in the forward direction is inputted to the motors 2A, 2B side, the one-way clutch 50 comes into a disengaged state, and power transmission may not be achieved only by the one-way clutch 50. However, by establishing a connected state between the motors 2A, 2B, and the rear wheels Wr by setting the hydraulic brakes 60A, 60B in a weakly coupled state, which are provided in parallel with the one-way clutch 50, a power transmissible state may be maintained. By controlling the motors 2A, 2B to be in a regenerative driving state under the above conditions, the energy of the vehicle 3 may be regenerated. Furthermore, in this state, as described above, the oil of the line oil passage 75 is reduced in pressure by the orifice 85b via the second low pressure oil passage 76b, and is supplied to the lubricating and cooling unit 91 so that lubrication and cooling is performed by the lubricating and cooling unit 91.

Subsequently, when the vehicle is accelerated, the vehicle is driven by four wheels using the front-wheel drive device 6 and the rear-wheel drive device 1. The rear-wheel drive device 1 is in the state of the forward travel at a low speed as illustrated in FIG. 15, and the hydraulic circuit 71 is in the state as illustrated in FIG. 10.

Figure 18:
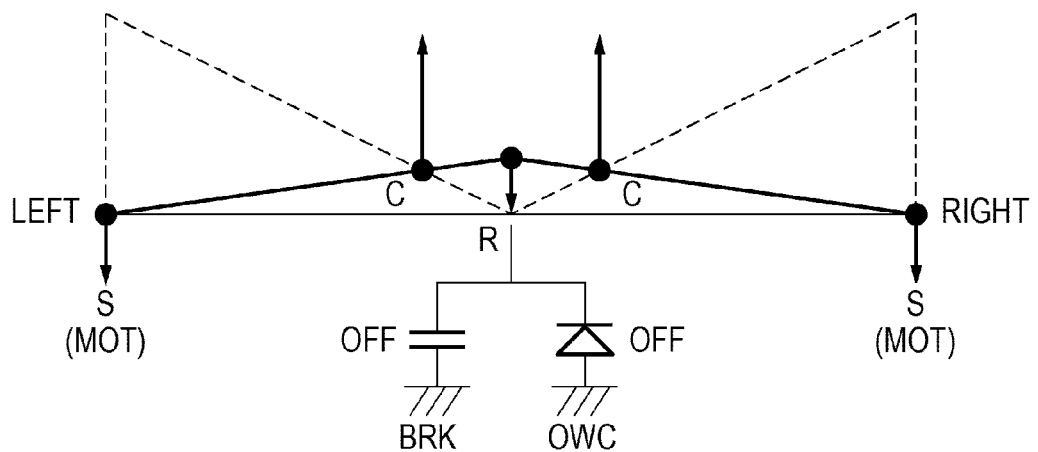
FIG. 18 is a speed lever analogy diagram of the rear-wheel drive device during forward travel of a vehicle at a high speed.

While the vehicle is moving in the forward direction at a high speed, the vehicle is driven by the front wheels using the front-wheel drive device 6. As illustrated in FIG. 18, when the power drive of the motors 2A, 2B is stopped, a torque in the forward direction, as a momentum for the forward move, acts on the planetary carriers 23A, 23B from the axles 10A, 10B, and thus the one-way clutch 50 comes into a disengaged state as described above.

At this point, as illustrated in FIG. 9, in the hydraulic circuit 71, the electric oil pump 70 operates in a low pressure mode (Lo), the solenoid 174 of the solenoid valve 83 is energized (ON), and the hydraulic brakes 60A, 60B are in a released state (OFF). Consequently, the dragging of the motors 2A, 2B is prevented, and overspeed of the motors 2A, 2B is prevented while the vehicle is moving at a high speed by the front-wheel drive device 6. Furthermore, in this state, as described above, the oil of the line oil passage 75 is reduced in pressure by the orifice 85a via the first low pressure oil passage 76a, and is supplied to the lubricating and cooling unit 91 so that lubrication and cooling is performed by the lubricating and cooling unit 91.

Figure 19:
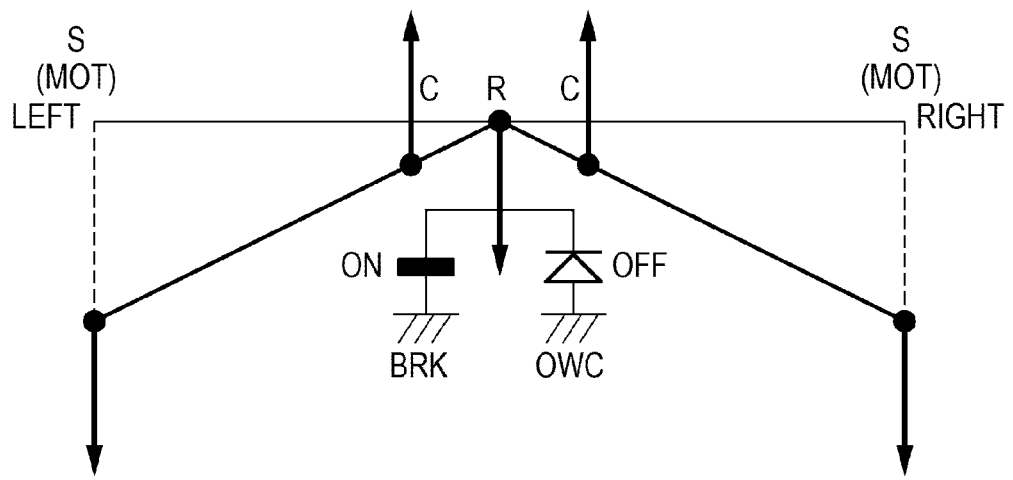
FIG. 19 is a speed lever analogy diagram of the rear-wheel drive device during reverse travel of a vehicle.

As illustrated in FIG. 19, at the time of reverse drive, when the motors 2A, 2B are power driven in the reverse direction, a torque in the reverse direction is applied to the sun gears 21A, 21B. At this point, the one-way clutch 50 comes into a disengaged state as described above.

At this point, as illustrated in FIG. 11, in the hydraulic circuit 71, the electric oil pump 70 operates in a high pressure mode (Hi), the solenoid 174 of the solenoid valve 83 is not energized (OFF), and the hydraulic brakes 60A, 60B are in a coupled state. Consequently, the ring gears 24A, 24B are locked, and the planetary carriers 23A, 23B rotates in the reverse direction, allowing the vehicle to move in the reverse direction. The running resistance from the axles 10A, 10B acts on the planetary carriers 23A, 23B in the forward direction. In this manner, when the rotational power of the motors 2A, 2B in the reverse direction is inputted to the rear wheels Wr, the one-way clutch 50 comes into a disengaged state, and power transmission may not be achieved only by the one-way clutch 50. However, by establishing a connected state between the motors 2A, 2B, and the rear wheels Wr by setting the hydraulic brakes 60A, 60B in a weakly coupled state, which are provided in parallel with the one-way clutch 50, a power transmissible state may be maintained, and the rotational power of the motors 2A, 2B allows the vehicle 3 to move in the reverse direction. Furthermore, in this state, as described above, the oil of the line oil passage 75 is reduced in pressure by the orifice 85b via the second low pressure oil passage 76b, and is supplied to the lubricating and cooling unit 91 so that lubrication and cooling is performed by the lubricating and cooling unit 91.

Thus, in the rear-wheel drive device 1, coupling and release of the hydraulic brakes 60A, 60B are controlled depending on the traveling state of the vehicle 3, in other words depending on whether the rotational direction of the motors 2A, 2B is the forward direction or the reverse direction, or whether power is inputted from the motors 2A, 2B or the rear wheels Wr, and even when the hydraulic brakes 60A, 60B are in a coupling state, the coupling force is adjusted.

Figure 20:
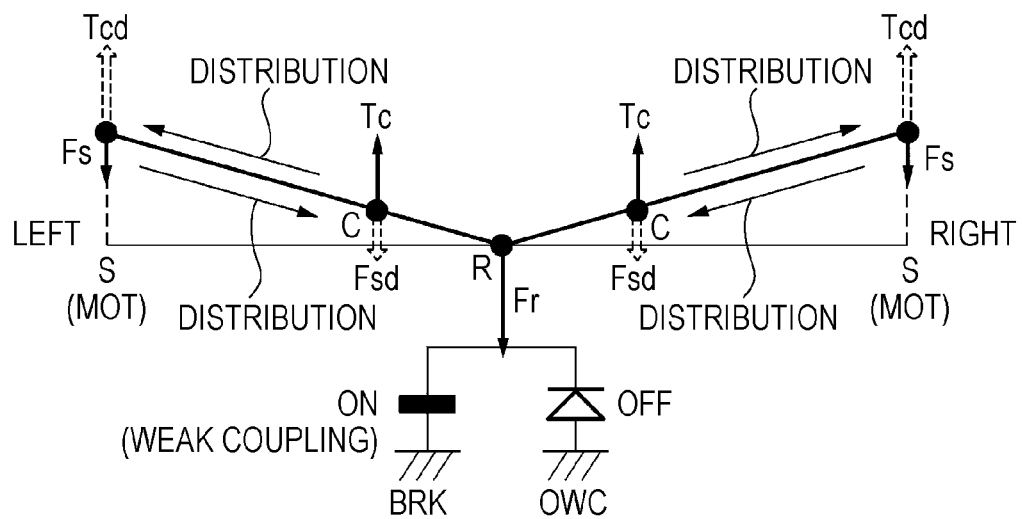
FIG. 20 is a speed lever analogy diagram in a state where loss reduction control is not performed during forward travel of a vehicle at a middle speed in FIG. 16.

Here, the loss reduction control in the present embodiment is described in detail. First, referring to FIG. 20, the case where the loss reduction control is not performed during the forward travel at a medium speed which has been explained in FIG. 16 is described. As described above, during the forward travel at a medium speed, the hydraulic brakes 60A, 60B are in a weakly coupled state, a running torque Tc in the forward direction, as a momentum for the forward move, acts on the planetary carriers 23A, 23B from the axles 10A, 10B; a coupling force Fr of the hydraulic brakes 60A, 60B acts on the ring gears 24A, 24B in the reverse direction; and a resistance force Fs caused by a loss in the motors acts on the sun gears 21A, 21B in the reverse direction.

The motor-side loss means a loss of the motors 2A, 2B (hereinafter, referred to as a MOT loss), and a loss of the planetary gear speed reducers 12A, 12B (hereinafter, referred to as a loss in transmission path) and the like which constitute the power transmission path. The MOT loss is specifically a friction loss, a copper loss, or an iron loss of the motors 2A, 2B, and the loss in transmission path is a friction loss which acts on cylinder shafts 16A, 16B which each serve as an output axis of the motors 2A, 2B, and the sun gears 21A, 21B.

In addition, distribution power Fsd of the resistance force Fs caused by the motor-side loss acts on the planetary carriers 23A, 23B in the reverse direction. The distribution power Fsd is the power generated in the planetary carriers 23A, 23B as the point of application when the resistance force Fs caused by the motor-side loss is applied to the sun gears 21A, 21B using the ring gears 24A, 24B locked by the hydraulic brakes 60A, 60B, as a fulcrum. The distribution power Fsd which is generated in the planetary carriers 23A, 23B acts on the rear wheels Wr as the resistance while the vehicle 3 is traveling.

Additionally, the distribution power Tcd of the running torque Tc acting on the planetary carriers 23A, 23B also acts on the sun gears 21A, 21B in the forward direction. The distribution power Tcd of the running torque Tc is the power generated in the sun gears 21A, 21B as the point of application when the running torque Tc is applied to the planetary carriers 23A, 23B using the ring gears 24A, 24B locked by the hydraulic brakes 60A, 60B, as a fulcrum. The motors 2A, 2B are dragged by the distribution power Tcd.

In the present embodiment, when the vehicle moves forward at a medium speed, that is to say when the vehicle 3 is driven in a state where the driving force of the rear-wheel drive device 1 is substantially zero, or the vehicle 3 is driven only by the driving force of the front-wheel drive device 6, loss reduction control for controlling the motors 2A, 2B is performed in order to reduce the motor-side loss. As such a loss reduction control, two control methods: motor end zero torque control and wheel end zero torque control are described below.

<Motor End Zero Torque Control>

Figure 21:
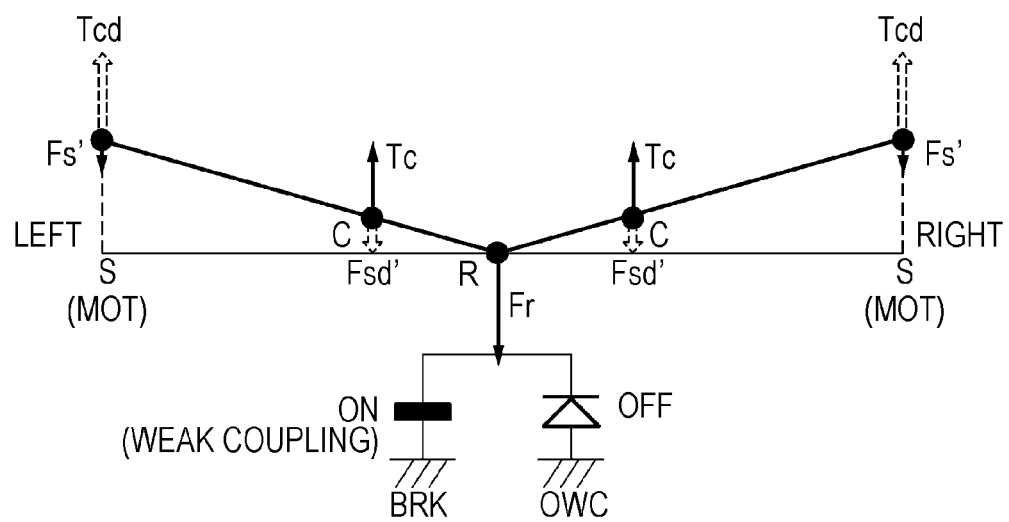
FIG. 21 is a speed lever analogy diagram in a state where motor end zero torque control is performed during forward travel of a vehicle at a middle speed in FIG. 16.

First, the motor end zero torque control is described with reference to FIGS. 21 and 22. The motor end zero torque control is a control for counteracting a resistance force caused by a negative torque (MOT loss) which is generated in a state where the motors 2A, 2B are dragged.

Figure 22:
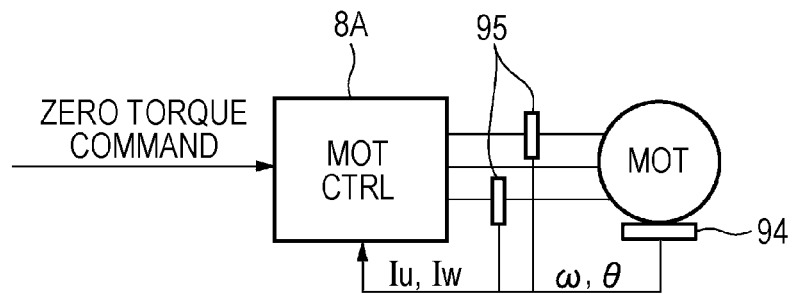
FIG. 22 is a diagram illustrating a system of a motor controller which performs motor end zero torque control.

As illustrated in FIG. 22, the following values are inputted to a motor control device 8A (MOT CTRL) that constitutes part of the control units 8: an electrical degree θ of the rotor of the motors 2A, 2B, that is detected by a rotation sensor 94 attached to the motors 2A, 2B; an angular velocity ω of the rotor of the motors 2A, 2B, that is calculated by differentiating the detected value of the electrical degree θ with respect to time; values of a U-phase current Iu and a W-phase current Iw that are detected by a phase current sensor 95; and a zero torque command.

In a state where the motors 2A, 2B are dragged by the distribution power Tcd of the running torque Tc, which acts on the planetary carriers 23A, 23B, MOT loss occurs in the motors 2A, 2B in accordance with the rotation thereof. The motor control device 8A acquires a MOT loss based on the electrical degree θ, the angular velocity ω, and the U-phase current Iu and the W-phase current Iw that are detected by the phase current sensor 95.

The motor control device 8A then controls the motors 2A, 2B to be in a zero torque state based on the zero torque command so that the acquired MOT loss becomes substantially zero.

Thus, the MOT loss is counteracted, and a resistance force Fs' which is caused only by the loss in transmission path out of the motor-side loss acts on the sun gears 21A, 21B. Consequently, the distribution power Fsd' generated in the planetary carriers 23A, 23B is also reduced by the MOT loss.

In this manner, by performing the motor end zero torque control when the vehicle 3 is driven in a state where the torque of the rear-wheel drive device 1 is substantially zero, or the vehicle 3 is driven only by the torque of the front-wheel drive device 6, a load (negative torque) generated in the rear wheels Wr via the planetary carriers 23A, 23B may be reduced, and thus the running performance of the vehicle 3 may be improved. Compared with the wheel end zero torque control described later, the motor end zero torque control needs less power consumption.

In addition, the motor end zero torque control only counteracts the loss of the motors 2A, 2B, and thus acquisition of a loss is easy. Furthermore, the current values of the motors 2A, 2B are taken into consideration for acquiring the loss, the loss may be estimated with increased precision.

<Wheel End Zero Torque Control>

Figure 23:
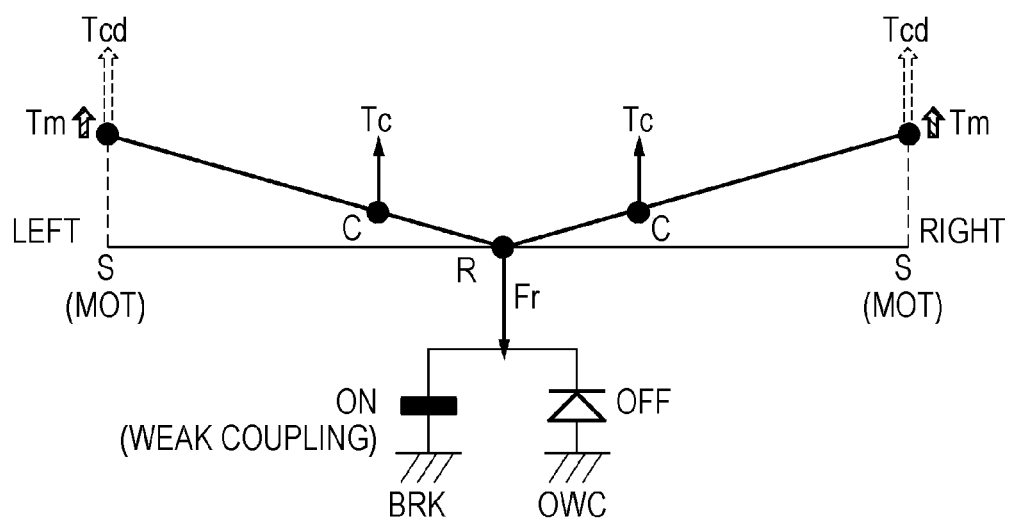
FIG. 23 is a speed lever analogy diagram in a state where wheel end zero torque control is performed during forward travel of a vehicle at a middle speed in FIG. 16.
Figure 24:
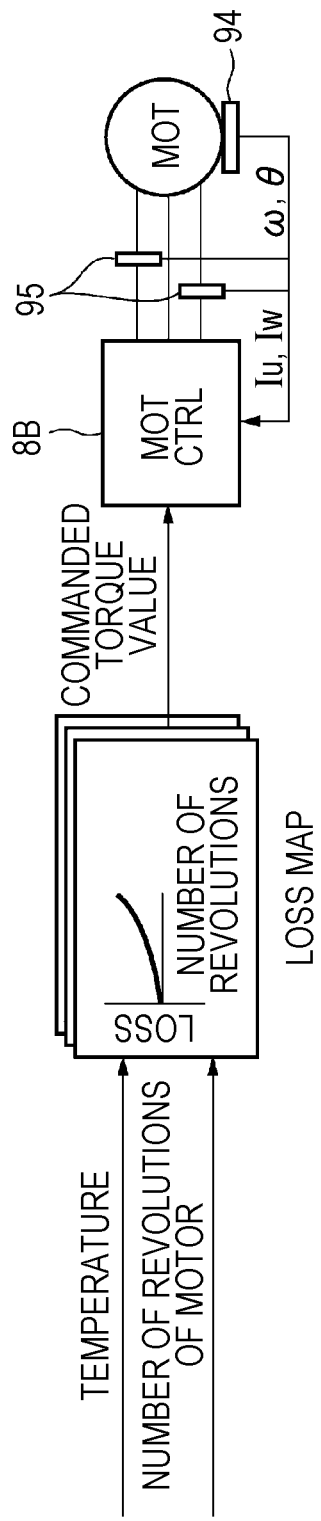
FIG. 24 is a diagram illustrating a system of a motor controller which performs wheel end zero torque control.

Next, the wheel end zero torque control is described with reference to FIGS. 23 and 24. The wheel end zero torque control is such that the control unit 8 generates a MOT loss, and a torque Tm in the forward direction in the motors 2A, 2B, the torque Tm corresponding to the loss in transmission path so that the resistance force Fs described in FIG. 20, which acts on the sun gears 21A, 21B, and is caused by the motor-side loss becomes 0, thereby counteracting the MOT loss and the resistance force caused by the loss in transmission path.

In the wheel end 0 torque control, the total loss of the MOT loss and the loss in transmission path, i.e., the motor-side loss is acquired based on the loss MAP which is measured experimentally or is calculated and stored in advance from the temperature and the rotational number (rotational number of motor) of the motors 2A, 2B.

The following values are inputted to the motor control device 8B (MOT CTRL) that constitutes part of the control units 8: an electrical degree θ of the rotor of the motors 2A, 2B, that is detected by the rotation sensor 94 attached to the motors 2A, 2B; an angular velocity ω of the rotor of the motors 2A, 2B, that is calculated by differentiating the detected value of the electrical degree θ with respect to time; values of a U-phase current Iu and a W-phase current Iw that are detected by the phase current sensor 95; and a torque command value. The motor control device 8B controls the generated torque Tm of the motors 2A, 2B for counteracting the motor-side loss based on the torque command value determined in accordance with the loss MAP.

By generating the torque Tm in the forward direction in the motors 2A, 2B, the torque Tm corresponding to the motor-side loss (see FIG. 23), the motor-side loss is counteracted, that is to say, the resistance force Fs caused by the motor-side loss is counteracted. Therefore, the distribution power Fsd of the resistance force Fs caused by the motor-side loss, which acts on the planetary carriers 23A, 23B is substantially zero, and thus the resistance force is not generated in the rear wheels Wr.

Thus, by performing the wheel end zero torque control when the vehicle 3 is driven in a state where the driving force of the rear-wheel drive device 1 is substantially zero, or the vehicle 3 is driven only by the driving force of the front-wheel drive device 6, a load (negative torque) generated in the rear wheels Wr via the planetary carriers 23A, 23B may be substantially zero, and thus the running performance of the vehicle 3 may be improved.

In the wheel end zero torque control, the loss MAP is measured experimentally or is calculated and stored in advance with being associated with the temperature and the rotational number of the motors 2A, 2B, and thus successive calculation (estimation) of the loss is unnecessary. The loss MAP is not required to be associated with both of the temperature and the rotational number of the motors 2A, 2B, but may be associated with either one of them. As the rotational number, not only the rotational number of the motors 2A, 2B, but also the rotational number of a rotating member which constitutes the power transmission path, for example, the sun gears 21A, 21B of the planetary gear speed reducers 12A, 12B may be used.

In addition, the loss MAP may be diverted except for the wheel end zero torque control. For example, in the loss MAP, at least one of the rotational number of the motors 2A, 2B, the rotational number of a rotating member which constitutes the power transmission path, and the temperature of the motors 2A, 2B, and MOT loss which is a loss of the motors 2A, 2B may be associated with each other and is stored. Alternatively, at least one of the rotational number of the motors 2A, 2B, the rotational number of a rotating member which constitutes the power transmission path, and the temperature of the motors 2A, 2B, and only the loss in transmission path, which is a loss of the planetary gear speed reducers 12A, 12B and the like which constitute the power transmission path, may be associated with each other and is stored. In these cases a load (negative torque) generated in the rear wheels Wr via the planetary carriers 23A, 23B cannot be substantially zero, however, when either one of the MOT loss and the loss in transmission path is greater than the other, the greater loss may be counteracted.

As described above, according to the present embodiment, when the vehicle 3 is driven in a state where the torque of the rear-wheel drive device 1 is substantially zero, or the vehicle 3 is driven only by the torque of the front-wheel drive device 6, matching of rotational number normally required when the motors 2A, 2B of the rear-wheel drive device 1 are driven again may be omitted by establishing a connected state of the hydraulic brakes 60A, 60B. In this case, when the hydraulic brakes 60A, 60B are coupled, the motors 2A, 2B, and its transmission path are each loss, and applies a load (negative torque) to wheels Wr. Thus the control unit 8 performs loss reduction control for controlling the motors 2A, 2B so as to reduce the loss in at least one of the motors 2A, 2B and the power transmission path, which occurs in the rear wheels Wr, by establishing a connected state of the hydraulic brakes 60A, 60B, and thus the running performance of the vehicle 3 may be improved.

The rear-wheel drive device 1 of the present embodiment is provided with the one-way clutch 50 and the hydraulic brakes 60A, 60B in parallel on the power transmission path between the motors 2A, 2B and the rear wheels Wr, and when the rotational power of the motors 2A, 2B in the forward direction is inputted to the rear wheels Wr, the one-way clutch 50 comes into an engaged state, and power transmission may be achieved by the one-way clutch 50. Therefore, the hydraulic brakes 60A, 60B may be released, or the coupling force in a connected state of the hydraulic brakes 60A, 60B may be reduced, and thus the energy accompanying the coupling of the hydraulic brakes 60A, 60B may be reduced.

A rear-wheel drive device in a vehicle of the present embodiment is not limited to the rear-wheel drive device 1 of the above-described embodiment, and as long as the rear-wheel drive device includes a motor to generate a driving force of a vehicle, and a wheel which rotates by power of a motor, the configuration of the rear-wheel drive device is not limited. For example, a configuration in which the motor is constantly connected to the wheel, without including the one-way clutch 50 as a one-way power transmission unit, and the hydraulic brakes 60A, 60B as connection-disconnection units may be employed. In addition, a configuration in which the motor is directly connected to the wheel, without including the planetary gear speed reducers 12A, 12B as speed change gears may also be employed. Also in a vehicle using these rear-wheel drive devices, when the vehicle is driven in a state where the torque of the front-wheel drive device is substantially zero, or the vehicle is driven only by the torque of other driving source, the running performance of the vehicle may be improved by performing loss reduction control for controlling the motor so as to reduce the loss of at least one of the motor and the power-transmission path.

The present embodiment is not limited to the embodiment described above, and the embodiment may be modified or improved as needed. That is to say, the rear-wheel drive device used for the vehicle in the present embodiment is not limited in configuration as long as the rear-wheel drive device includes a motor and a wheel. For example, the hydraulic brakes 60A, 60B are not required to be provided with the ring gears 24A, 24B, respectively. The connected ring gears 24A, 24B only need to be provided with at least one hydraulic brake and one one-way clutch. On the contrary, the ring gears 24A, 24B are not required to be connected to each other, and both ring gears 24A, 24B may be each provided with a one-way clutch and a hydraulic brake. Although the planetary gear speed reducers 12A, 12B have been illustrated as a speed change gear, an arbitrary speed change gear may be used without being limited to this case. Furthermore, a speed change gear is not necessarily required to be provided. The right wheel and the left wheel may be controlled by a single motor. Although the hydraulic brake has been illustrated as a connection-disconnection unit, mechanical type, electromagnetic type, or the like may be used without being limited to this case. The front-wheel drive device may use a motor as a only driving source without using an internal combustion engine.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
    a first drive device to drive a first driving wheel which is one of a front wheel and a rear wheel; and
    a second drive device to drive a second driving wheel which is another of the front wheel and the rear wheel, the first drive device being mechanically independent from the second drive device,
    wherein the first drive device includes
        a motor configured to generate a driving force of the vehicle,
        a motor control device configured to control the motor, a connection-disconnection device provided on a power transmission path between the motor and the first driving wheel, the connection-disconnection device being configured to establish a connected state or a disconnected state between the motor and the first driving wheel by releasing or coupling the connection-disconnection device, and a connection-disconnection device controller configured to control the connection-disconnection device, wherein when the vehicle is driven in a state where a driving force of the first drive device is substantially zero, or the vehicle is driven only by a driving force of the second drive device, the connection-disconnection device controller couples the connection-disconnection device to establish the connected state of the connection-disconnection device, and wherein the motor control device is configured to perform loss reduction control on the motor to reduce at least one of a first loss in the motor and a second loss in the power transmission path, the at least one of the first loss and the second loss being transmitted to the first driving wheel by establishing the connected state of the connection-disconnection device.

2. The vehicle according to claim 1,
wherein in the loss reduction control, the motor control device is configured to acquire the loss of the motor and the loss in the power transmission path, and is configured to control the motor to reduce the loss of the motor and the loss in the power transmission path.

3. The vehicle according to claim 1,
wherein in the loss reduction control, the motor control device is configured to acquire the loss of the motor, and is configured to control the motor to reduce the loss of the motor.

4. The vehicle according to claim 1,
wherein in the loss reduction control, the motor control device is configured to acquire the loss in the power transmission path, and is configured to control the motor to reduce the loss in the power transmission path.

5. The vehicle according to claim 2,
wherein at least one of the loss of the motor and the loss in the power transmission path is determined based on at least one of a rotational number of the motor, a rotational number of a rotating member which constitutes the power transmission path, and a temperature of the motor.

6. The vehicle according to claim 2,
wherein at least one of the loss of the motor and the loss in the power transmission path is determined based on a current of the motor.

7. The vehicle according to claim 5,
wherein at least one of the loss of the motor and the loss in the power transmission path is measured experimentally or is calculated and stored in advance.

8. The vehicle according to claim 1, further comprising:
an one-way power transmission device provided on the power transmission path between the motor and the first driving wheel, in parallel with the connection-disconnection device, wherein when a rotational power of the motor in a forward direction is inputted to the first driving wheel, the one-way power transmission device comes into an engaged state, when a rotational power of the motor in a rearward direction is inputted to the first driving wheel, the one-way power transmission device comes into a disengaged state, when a rotational power of the first driving wheel in a forward direction is inputted to the motor, the one-way power transmission device comes into a disengaged state, and when a rotational power of the first driving wheel in a rearward direction is inputted to the motor, the one-way power transmission device comes into an engaged state.

9. The vehicle according to claim 1,
wherein the first driving wheel is the rear wheel, and the second driving wheel is the front wheel.

10. The vehicle according to claim 9,
wherein the second drive device includes an additional motor connected to the second driving wheel, the additional motor being configured to generate a driving force of the vehicle.

11. The vehicle according to claim 10,
wherein the second drive device further includes an engine connected to the second driving wheel, the engine being configured to generate a driving force of the vehicle.

12. A vehicle comprising:
a first drive device to drive a first driving wheel which is one of a front wheel and a rear wheel; and
a second drive device to drive a second driving wheel which is another of the front wheel and the rear wheel, the first drive device being mechanically independent from the second drive device, wherein the first drive device includes
a motor constantly connected to the first driving wheel, the motor being configured to generate a driving force of the vehicle, and
a motor control device configured to control the motor, wherein when the vehicle is driven in a state where a driving force of the first drive device is substantially zero, or the vehicle is driven only by a driving force of the second drive device, the motor control device performs loss reduction control on the motor so as to reduce a loss of the motor in power transmitted to the first driving wheel.

13. The vehicle according to claim 12,
wherein the loss of the motor is determined based on at least one of rotational number of the motor and a temperature of the motor.

14. The vehicle according to claim 12,
wherein the loss of the motor is determined based on a current of the motor.

15. The vehicle according to claim 13,
wherein the loss of the motor is measured experimentally or is calculated and stored in advance.

16. The vehicle according to claim 12,
wherein the first driving wheel is the rear wheel, and the second driving wheel is the front wheel.

17. The vehicle according to claim 12,
wherein the motor control device is further configured to perform the loss reduction control on the motor to reduce a second loss in a power transmission path between the motor and the first driving wheel.

18. The vehicle according to claim 16,
wherein the second drive device includes an additional motor connected to the second driving wheel, the additional motor being configured to generate a driving force of the vehicle.

19. The vehicle according to claim 18,
wherein the second drive device further includes an engine connected to the second driving wheel, the engine being configured to generate a driving force of the vehicle.

20. The vehicle according to claim 16,
wherein the second drive device includes an engine connected to the second driving wheel, the engine being configured to generate a driving force of the vehicle.

\* \* \* \* \*